(12) United States Patent
Valore et al.

(10) Patent No.: US 11,905,697 B2
(45) Date of Patent: Feb. 20, 2024

(54) DRAIN ASSEMBLY AND METHOD OF INSTALLATION

(71) Applicant: Oatey Co., Cleveland, OH (US)

(72) Inventors: Matthew Valore, Parma Heights, OH (US); Kai Zhang, Cleveland, OH (US)

(73) Assignee: OATEY CO., Cleveland, OH (US)

( * ) Notice: Subject to any disclaimer, the term of this patent is extended or adjusted under 35 U.S.C. 154(b) by 267 days.

(21) Appl. No.: 17/325,316

(22) Filed: May 20, 2021

(65) Prior Publication Data

US 2021/0363742 A1 Nov. 25, 2021

Related U.S. Application Data

(60) Provisional application No. 63/028,205, filed on May 21, 2020.

(51) Int. Cl.
*A47K 3/40* (2006.01)
*E03F 5/06* (2006.01)
*E03F 5/04* (2006.01)

(52) U.S. Cl.
CPC ............. *E03F 5/0407* (2013.01); *A47K 3/40* (2013.01); *E03F 5/041* (2013.01); *E03F 5/06* (2013.01)

(58) Field of Classification Search
CPC ............. F03F 5/0407; F03F 5/06; A47K 3/40
See application file for complete search history.

(56) References Cited

U.S. PATENT DOCUMENTS

| 6,941,703 | B2 | 9/2005 | MacLean et al. |
| 8,505,131 | B2 | 8/2013 | Doolittle et al. |
| 10,105,017 | B2 | 10/2018 | Clear et al. |
| 2009/0241442 | A1 | 10/2009 | MacLean et al. |
| 2011/0047695 | A1* | 3/2011 | Niedens ............... E03F 5/04 4/679 |
| 2011/0061161 | A1* | 3/2011 | Erlebach ............ E03F 5/0408 4/679 |
| 2011/0197351 | A1* | 8/2011 | Cook ................... A47K 3/40 4/604 |
| 2012/0180415 | A1* | 7/2012 | Doolittle ........... E04F 15/02188 52/302.1 |
| 2016/0281346 | A1* | 9/2016 | Clear ................... A47K 3/40 |
| 2019/0211540 | A1* | 7/2019 | Bernoti ............... E03F 5/0408 |
| 2021/0115655 | A1* | 4/2021 | Brill .................... E03F 5/0408 |

FOREIGN PATENT DOCUMENTS

| DE | 202009004446 U1 | 6/2009 |
| EP | 1123680 B1 | 12/2004 |
| EP | 1865117 B1 | 3/2017 |
| KR | 20-2012-0002750 U | 4/2012 |

* cited by examiner

*Primary Examiner* — Jeremy Carroll

(74) *Attorney, Agent, or Firm* — Thompson Hine LLP

(57) ABSTRACT

A drain assembly comprises a drain pan, a trim member, and a drain cover. The drain pan has a base and a pan sidewall, and the trim member has a trim sidewall. The pan sidewall, at least a portion of the upper surface of the base, and the trim sidewall define a drain channel therebetween. The drain cover defines a plurality of apertures and is positionable above the drain pan. The trim member is configured to transition between a first position and a second position. In the first position of the trim member, the drain channel has a first width that extends in a transverse direction. In the second position of the trim member, the drain channel has a second width that extends in the transverse direction. The first width is different than the second width.

19 Claims, 20 Drawing Sheets

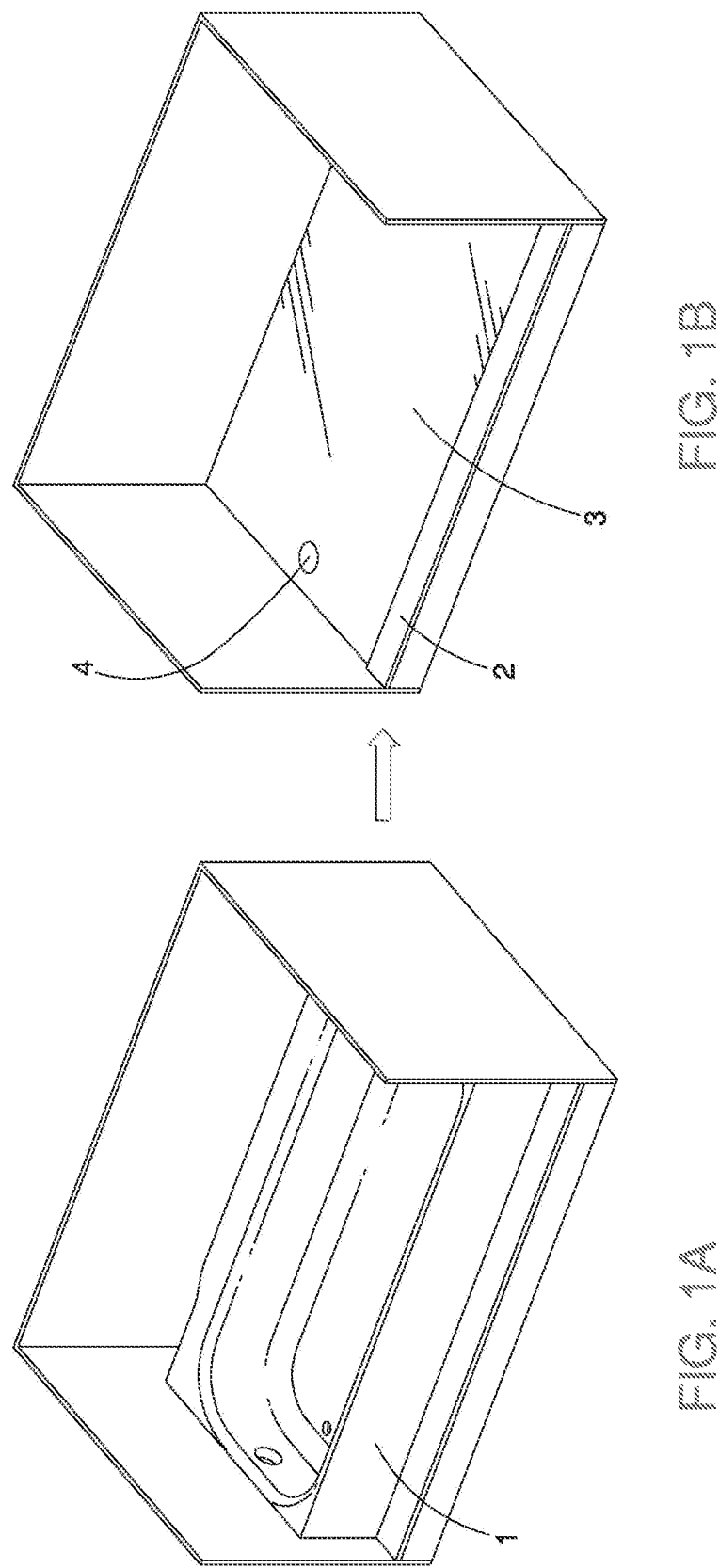

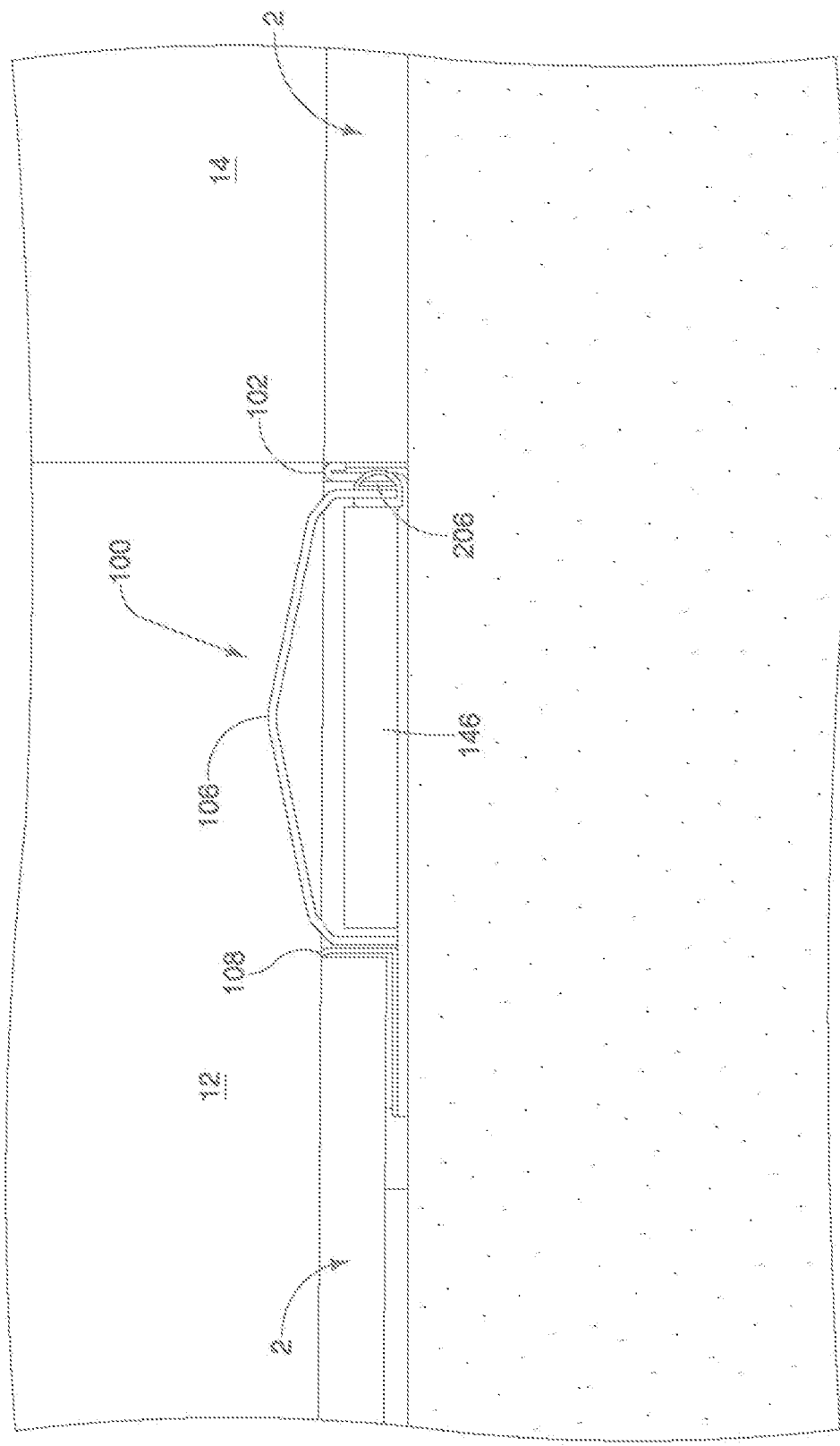

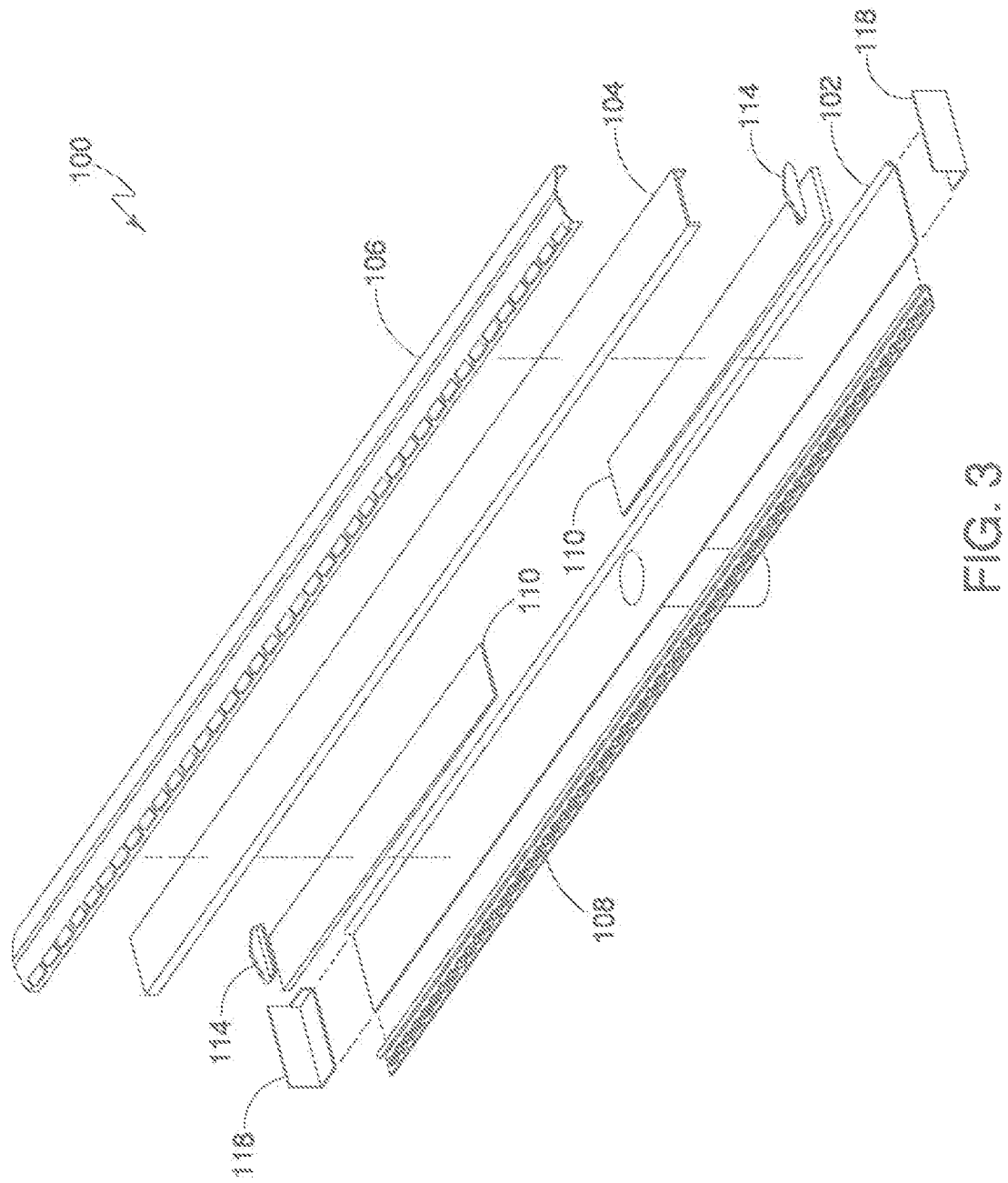

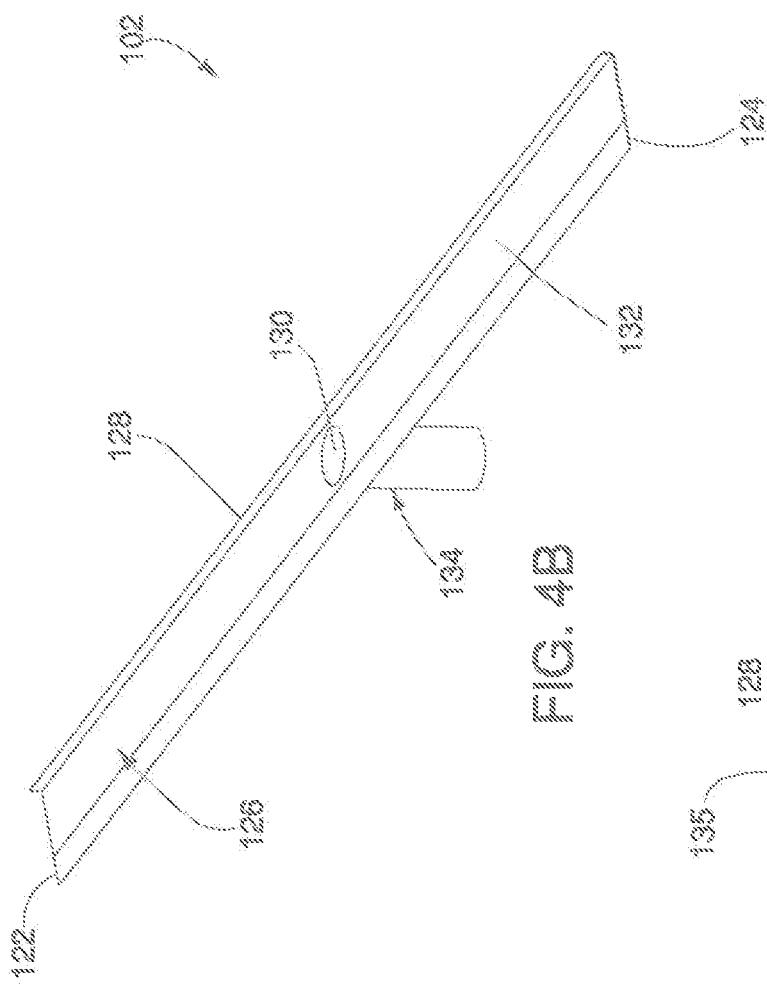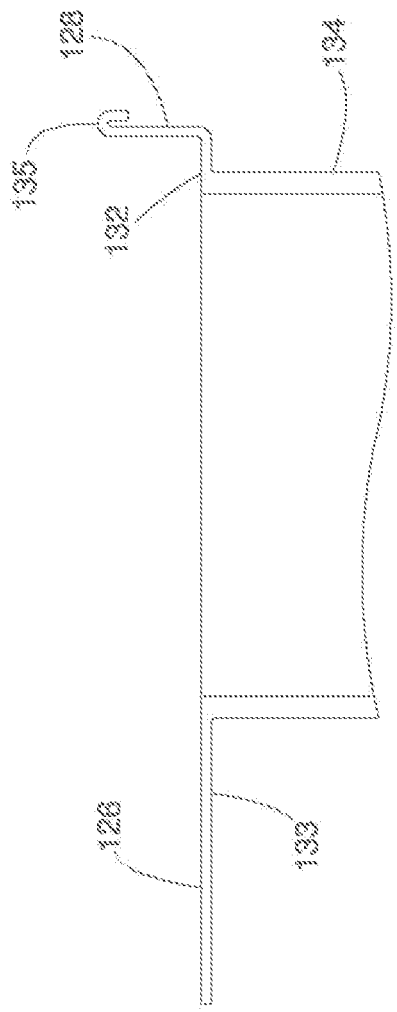

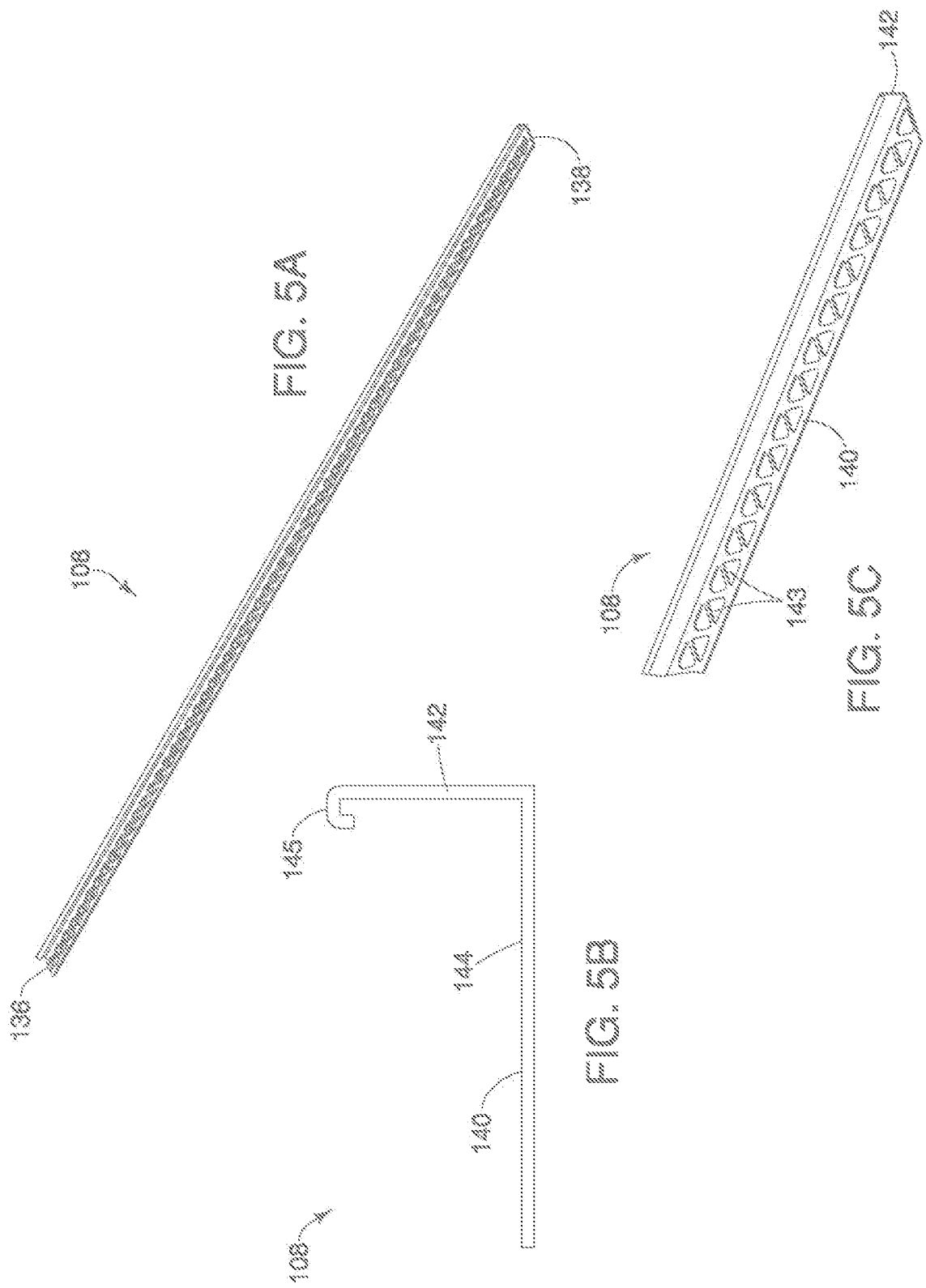

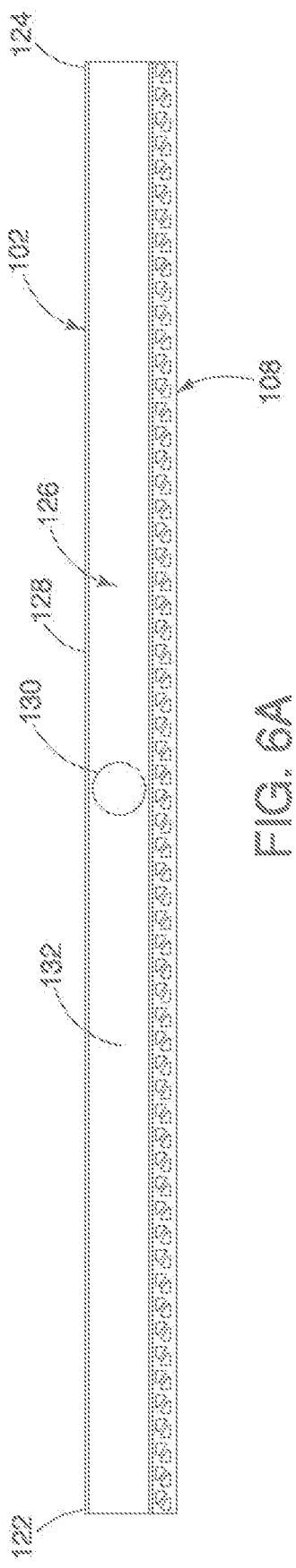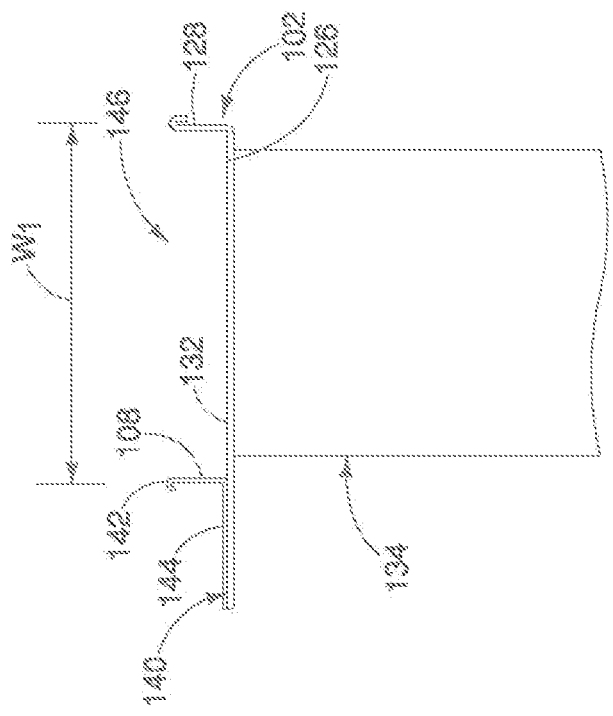

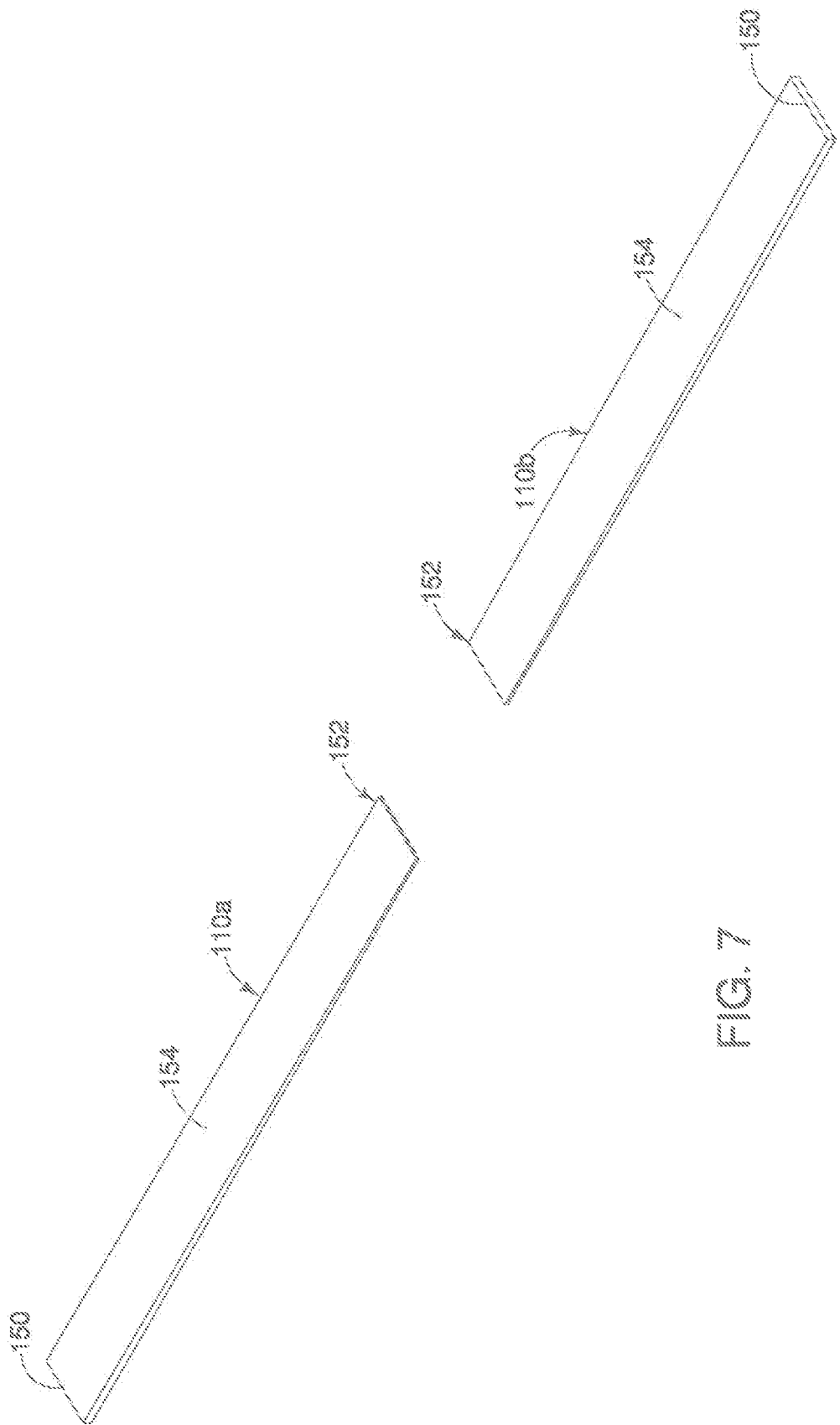

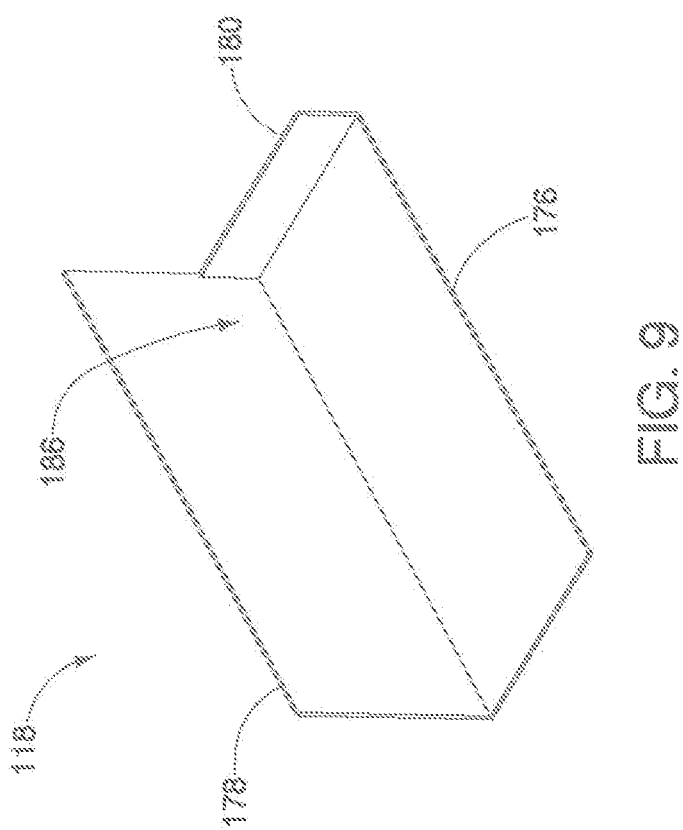
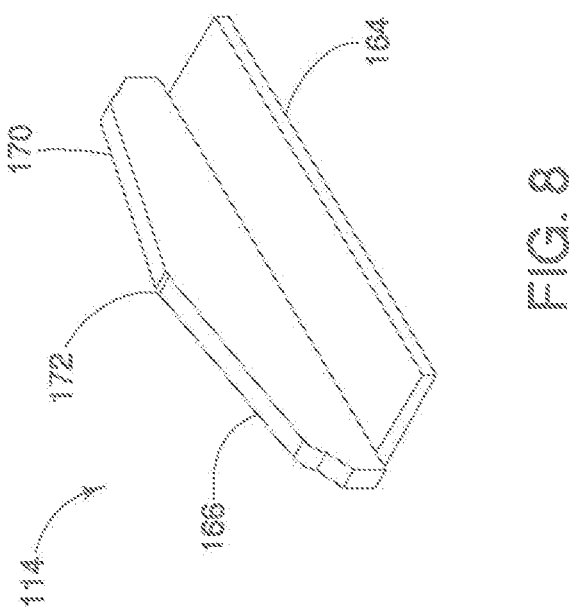

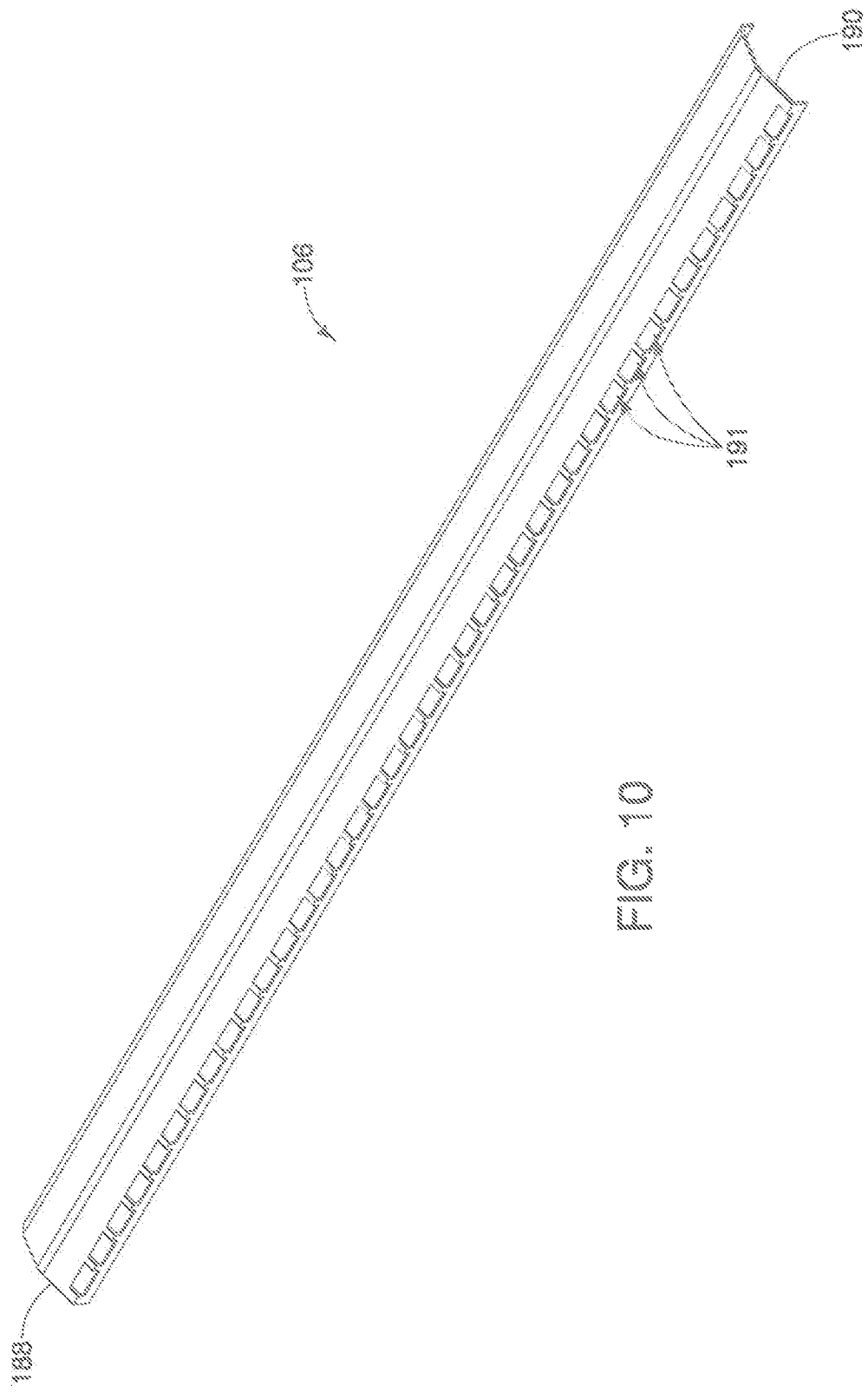

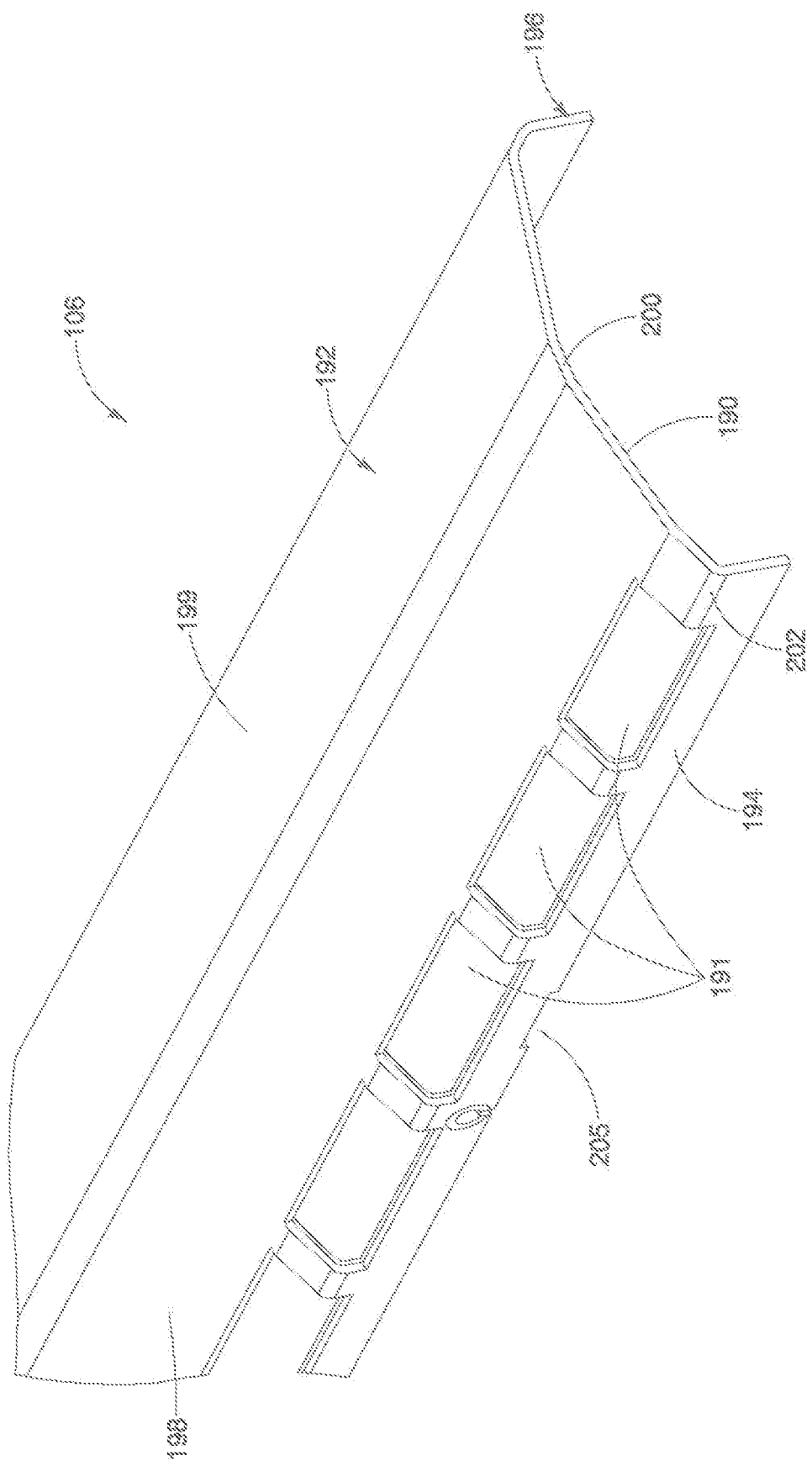

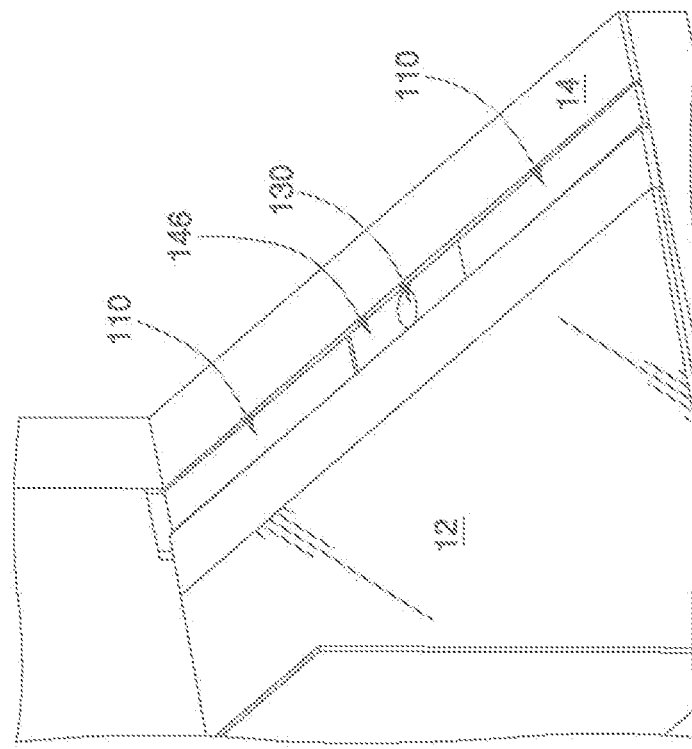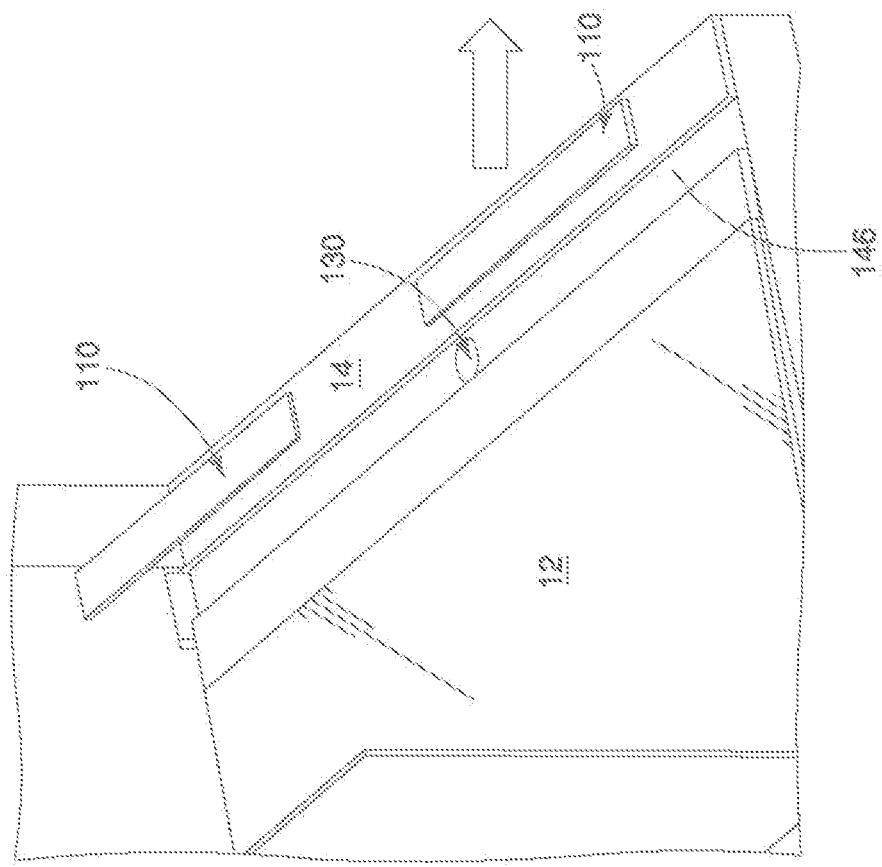
FIG. 19

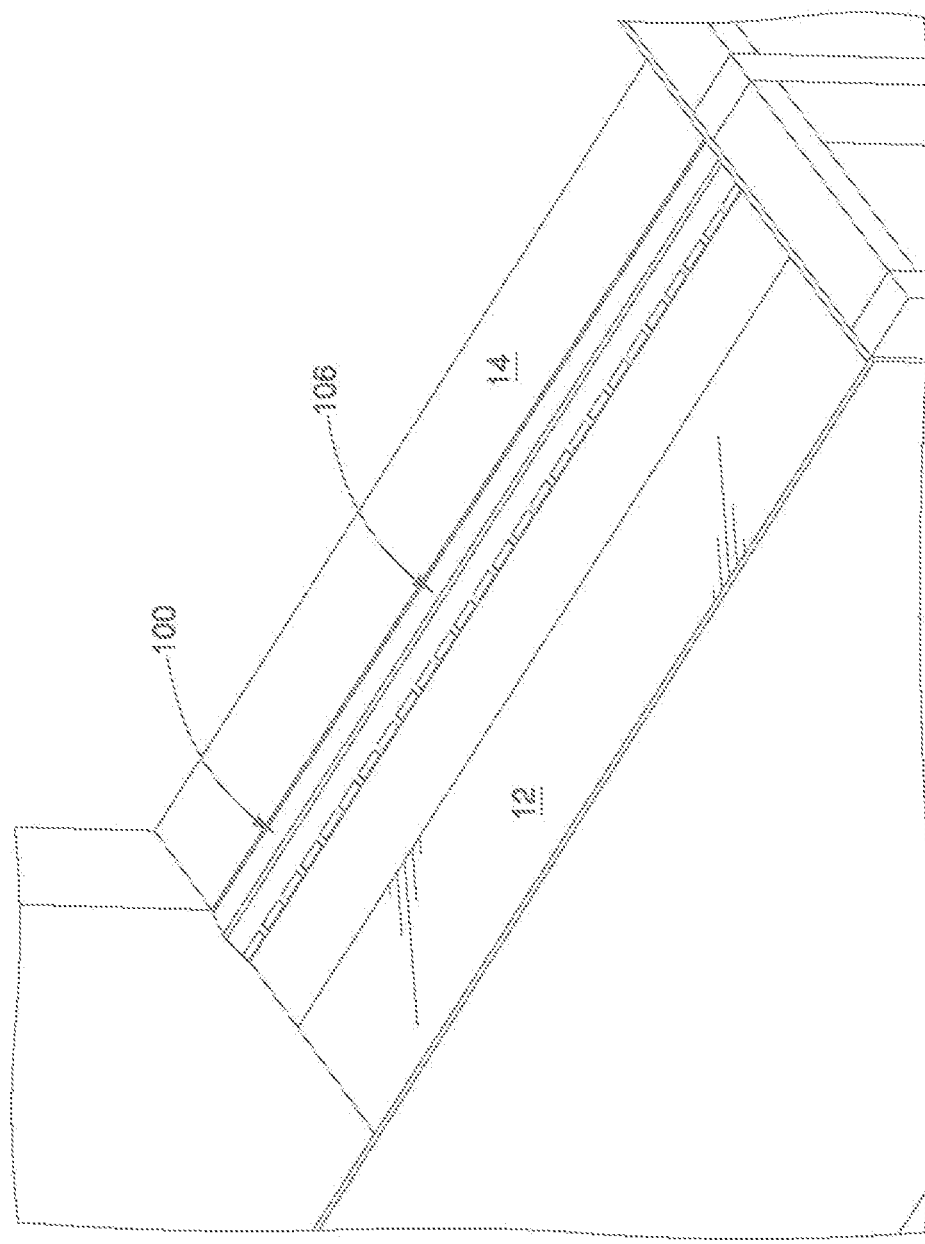

DRAIN ASSEMBLY AND METHOD OF INSTALLATION

CROSS-REFERENCE TO RELATED APPLICATION

This application claims benefit to U.S. Provisional Application No. 63/028,205, filed May 21, 2020, the entirety of which is incorporated by reference herein.

TECHNICAL FIELD

This disclosure relates generally to drain assemblies and methods of installation.

BACKGROUND

Floor drain assemblies are installed into a floor of a structure at a location where there is a potential for water to be present, such as a bathroom or shower area. Drain assemblies are generally connected to a drain pipe beneath the floor to drain water that can collect on the floor surface. The floors in the bathroom or shower area can be sloped slightly towards the drain location to ensure the water runs into the drain as opposed to sitting on the floor or seeping into the structure at an intersection of the floor and the walls. Typical bathroom and shower areas include elongated drains located on at least one edge of the bathroom or shower area to facilitate collection of water from the sloped floor.

Adjusting a location of a drain assembly during a renovation or remodeling of a bathroom or shower area can require the addition and removal of drain openings. In a curb-less area, floor material (e.g. concrete, wood substrate, etc.) around each new drain opening often needs to be chiseled away or otherwise removed to accommodate a new drain assembly. Removing the floor material can be time consuming, costly, and can result in an uneven surface that can affect the alignment of the new drain assembly, leading to leaks through the flooring and/or pooling of water on the surface of the bathroom or shower area.

Additionally, bathroom renovations often involve replacing a bathtub—often an alcove-type tub—with a shower stall within the same area where the bathtub was located, as shown in FIGS. 1A-1B. Once the bathtub 1 is removed, the tile flooring 2 that previously abutted the bathtub 1 is now exposed to an untiled surface, or subfloor 3 of the shower stall. It is sometimes desired to extend the tiles or other flooring previously abutting the bathtub into the new shower stall. However, a step or other raised area is usually necessary to prevent water from within the shower from flowing into the dry area of the bathroom. Further, when the bathtub is removed, the hole 4 through the subfloor 3 through which water was previously drained from the bathtub is often not in an ideal location for a shower drain and the drain would need to be moved to a different location, which can be a difficult and time-consuming process.

Therefore, there is a need for improved drain assembly to facilitate installation, minimize pooling, and prevent leaking.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

The foregoing needs are met, to a great extent, by the drain assembly disclosed in the present application. The drain assembly includes a cover design, seals, and end caps that create a geometry that allows a greater flow rate than conventional drains. Specifically, in a retrofit situation, where a bathtub area is being replaced by a shower area, a depth of installation for the drain assembly is limited due to a desire to leave existing tile in the bathroom in place. The drain assembly can be installed without removing existing tiling or chiseling away the flooring when replacing the bathroom area with a shower area. The drain assembly is also compliant with Americans with Disabilities (ADA) requirements.

An aspect of the present disclosure provides a drain assembly. The drain assembly comprises a drain pan, a trim member, and a drain cover. The drain pan has a base and a pan sidewall. The base and the pan sidewall extend from a first end of the drain pan to a second end of the drain pan in a longitudinal direction. The pan sidewall further extends from an upper surface of the base at least partially in a vertical direction. The vertical direction is substantially perpendicular to the longitudinal direction.

The trim member is positionable on the upper surface of the base such that a trim sidewall of the trim member extends at least partially in the vertical direction. The trim sidewall opposes the pan sidewall in a transverse direction. The transverse direction is substantially perpendicular to the longitudinal direction and the vertical direction. The trim sidewall, the pan sidewall, and at least a portion of the upper surface of the base define a drain channel therebetween.

The drain cover is positionable above the base of the drain pan in the vertical direction such that a plurality of apertures defined by the drain cover extend through the drain cover from an exterior of the drain assembly to the drain channel.

The trim member is configured to transition between a first position and a second position. In the first position of the trim member, the drain channel has a first width that extends in the transverse direction, and in the second position of the trim member, the drain channel has a second width that extends in the transverse direction. The first width is different than the second width.

An alternative aspect of the present disclosure provides a drain cover for a linear drain assembly. The drain cover comprises a cover wall, a first sidewall, and a second sidewall. The cover wall includes a first cover wall portion and a second cover wall portion. The first cover wall portion extends downward at least partially in a vertical direction from an apex of the drain cover to a first periphery. The first cover wall portion defines a plurality of apertures extending therethrough. The second cover wall portion extends downward at least partially in a vertical direction from the apex to a second periphery. The first sidewall extends downward from the first periphery of the first wall portion in the vertical direction. The second sidewall extends downward from the second periphery of the second wall portion in the vertical direction.

Another aspect of the present disclosure provides a method of installing a drain assembly to a pipeline in a subfloor. The method comprises: installing a drain pan substantially flush with the subfloor, the drain pan having a base and a pan sidewall, the base and the pan sidewall extending from a first end of the drain pan to a second end of the drain pan in a longitudinal direction, the pan sidewall further extending from an upper surface of the base at least partially in a vertical direction, the vertical direction being substantially perpendicular to the longitudinal direction; installing a trim member on top of the upper surface of the base, the trim member having a trim sidewall that extends at least partially in the vertical direction from the base, the trim sidewall opposing the pan sidewall in a transverse direction, the transverse direction being substantially perpendicular to the longitudinal direction and the vertical direction, wherein the trim sidewall, the pan sidewall, and at least a portion of the upper surface of the base define a drain channel therebetween; and positioning a drain cover at least partially within the drain channel.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings:

FIG. 1A illustrates an alcove bathtub positioned on a floor in a tub/shower stall.

FIG. 1B illustrates the bathtub of FIG. 1A removed.

FIG. 2B illustrates a cross-sectional end view of the drain assembly of FIG. 2A.

FIG. 3 illustrates an exploded perspective view of the drain assembly shown in FIG. 2A.

FIGS. 4A and 4B illustrate an embodiment of a drain pan of the drain assembly.

FIGS. 5A-5C illustrate a magnified top elevation view and a side elevation view, respectively, of an embodiment of a trim member of the drain assembly.

FIG. 6A-6B illustrate a top view and an end view of a trim member secured to a guide pan.

FIG. 7 illustrates an embodiment of a first wedge and a second wedge.

FIG. 8 illustrates a perspective views of an end cap.

FIG. 9 illustrates a perspective views of an end dam.

FIG. 10 illustrates a top perspective view of a drain cover.

FIG. 11 illustrates a closeup perspective view of a portion of the drain cover shown in FIG. 10.

FIG. 19 illustrates the removal of the guide member from the drain channel and installation of the first and second wedges into the drain channel as well as installation of tiles within the water collection area.

FIG. 20 illustrates the installation of the drain cover of the drain assembly.

DETAILED DESCRIPTION

Figure 2A:
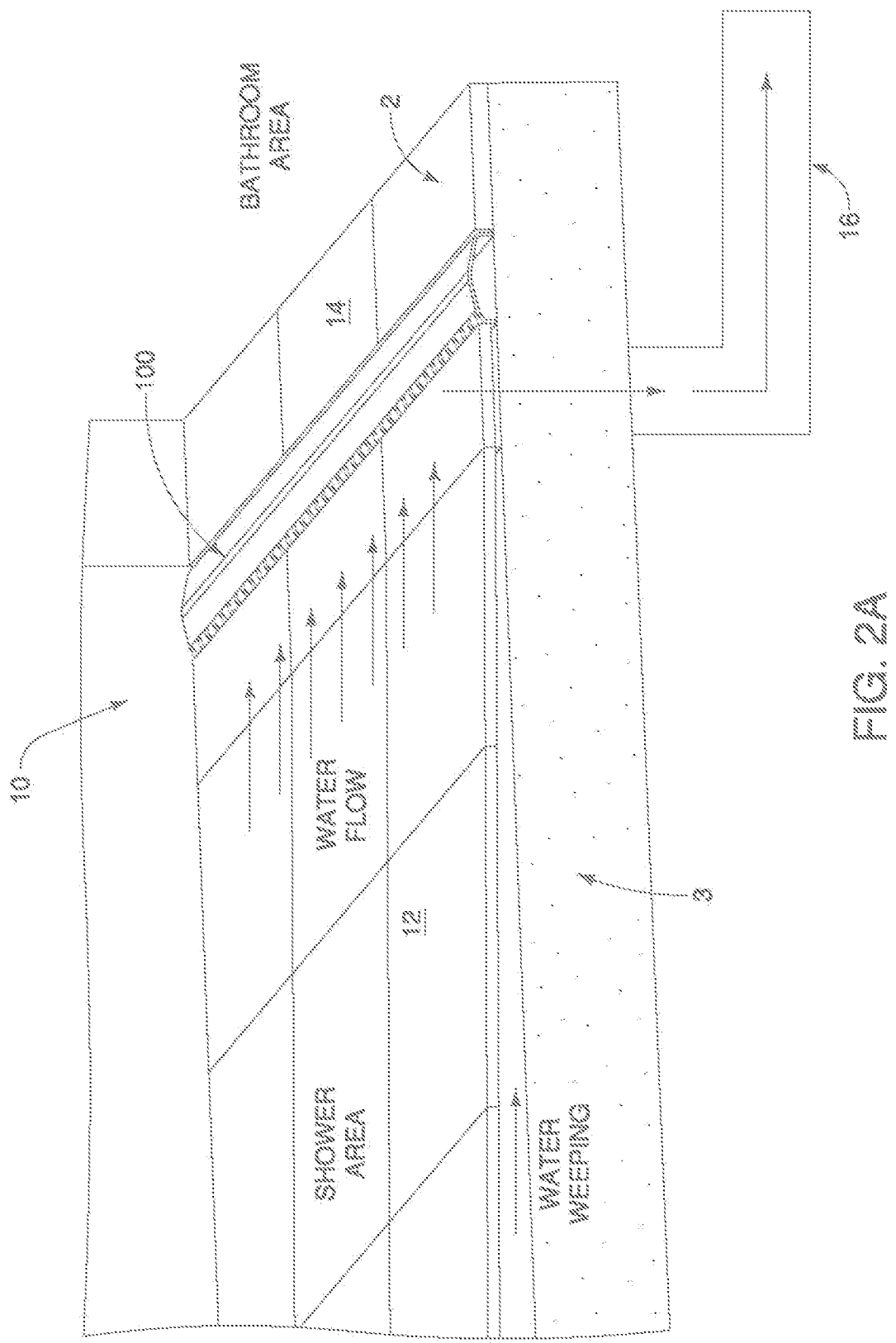
FIG. 2A illustrates a top perspective view of an exemplary embodiment of a drain assembly.

Certain terminology used in this description is for convenience only and is not limiting. The words "axial", "radial", "outward", "inward", "upper," and "lower" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

FIGS. 2A-2B illustrate a drain assembly 100 positioned in a water drainage area 10, wherein the exemplary water drainage area 10 is between a shower area and the bathroom area outside of the shower area. It should be understood by one having ordinary skill in the art that the water drainage area 10 shown and described herein is within a bathroom/shower area, but the drain assembly 100 can also be used in commercial or residential kitchens, production facilities, or any other location that requires water or other fluids to be drained through the floor. The water drainage area 10 can include a water collection or build-up area 12 and a dry area 14. It should be understood by one having ordinary skill in the art that some water drainage areas 10 do not include a dry area 14 such that the entire floor can receive water or fluid that needs to be drained by way of the drain assembly 100. The water collection area 12, as shown in FIGS. 2A-2B, can be considered an "inside" portion of the water drainage area 10, and the dry area 14 can be considered the "outside" portion of the water drainage area 14, wherein the drain assembly 100 is configured to act as a barrier or physical separation between the water collection area 12 and the dry area 14 to prevent flowing or collected water from water collection area 12 from passing into the dry area 14. The drain assembly 100 is also positioned between the inside and outside portions 12 and 14 to drain water from the inside portion 12 into a pipeline 16 (FIG. 2A) or other exit pathway located below the floor and away from the drainage area 10. The drain assembly 100 eliminates the need for a step or ledge that is typically used between a walk-in shower and the surrounding bathroom area, wherein the drain assembly 100 provides a zero-entry into the shower area. The drain assembly 100 also complies with the ANSI A117.1.303 standards as well as ADA 608.7 standards with respect to shower entries for accessible floors, particularly for roll-in showers.

FIG. 3 illustrates an exploded perspective view of an exemplary embodiment of the drain assembly 100. This embodiment of the drain assembly 100 includes a drain pan 102, a drain cover 106, a trim member 108, first and second wedges 110, first and second end caps 114, and first and second end dams 118. The drain assembly 100 can also include a guide member 104 that is temporarily positioned within the drain pan 102 when installing the drain assembly 100 but removed before the assembly of the drain assembly 100 is complete, as will be explained below. The illustrated drain assembly 100 extends substantially linearly from a first end to a second end, but it should be understood by one having ordinary skill in the art that the drain assembly 100 may also be curved, L-shaped, have an arcuate shape, or any other non-linear shape. The drain assembly 100 is positioned above the subfloor 3 (FIG. 1B) when installed.

FIGS. 4A-4B illustrate an exemplary embodiment of the drain pan 102. The drain pan 102 is configured to provide a base for the drain assembly 100 while also providing a pathway or passageway through which water or other fluids can flow or otherwise be transported away from the area. The drain pan 102 provides a barrier between the water collection area 12 and the subfloor 3 as well as between the collection area 12 and the dry area 14 in a retrofit application after a bathtub 1 has been removed. In an embodiment, the drain pan 102 is an L-shaped member. Typical drain pans of linear drain assemblies are U-shaped, which prevents water or fluid that has seeped below the tiles to be drained due to both opposing vertical walls of the U-shaped drain pain. If the water or fluid that has seeped below the tiles 2 cannot be drained, the standing water or fluid tends to cause molding issues with or rapid degradation of the grout between tiles. The L-shaped drain pan 102 of the drain assembly 100 allows the water or fluid that has seeped below the tiles 2 to be drained through weeping.

In the illustrated embodiment, the drain pan 102 is configured to be positioned atop the subfloor 3 and adjacent to the tile flooring 2 that remained when the bathtub 1 was removed, as shown in FIG. 2B. In another embodiment (not shown), the drain pan 102 is configured to be positioned atop the subfloor 3, cement base, or the like and abutting a wall or adjacent to tiles that have already been set or tiles that will be set subsequently.

In the embodiment illustrated in FIGS. 4A-4B, the drain pan 102 extends from a first end 122 to a second end 124 in a substantially linear manner. The drain pan 102 includes a base 126, a pan sidewall 128, and a drain pipe 134 extending downwardly from a lower surface 133 of the base 126, wherein the drain pipe 134 defines a drain opening 130 in the base 126. In an embodiment, the drain pipe 134 is integrally formed with the lower surface 133 of the base 126. In other embodiments, the drain pipe 134 is formed separately from the base 126 and attached to a lower surface 133 prior to installation of the drain assembly 100. The drain pipe 134 is fluidly and physically connected to the pipeline 16 (FIG. 2A) that transports the water or fluid away from the drain assembly 100. The length of both the base 126 and the pan sidewall 128 are substantially the same such that both the base 126 and pan sidewall 128 extend the entire distance between the first end 122 and the second end 124 of the drain pan 102. The pan sidewall 128 extends at an angle from an upper surface 132 of the base 126. In the illustrated embodiment, the pan sidewall 128 extends substantially perpendicular to the upper surface 132 of the base 126. It should be understood by one having ordinary skill in the art that the pan sidewall 128 can extend at a non-perpendicular angle relative to the upper surface 132 of the base 126. In the illustrated embodiment, the upper distal end of the pan sidewall 128 is formed as a rounded edge 135, wherein the edge of the pan sidewall 128 is bent 180° away from the base 126 of the guide pan 102 such that the upper distal end of the pan sidewall 128 is rounded and has a double-thickness. This rounded edge 135 of the pan sidewall 128 provides a rounded top surface instead of a sharp edge against which a user steps on the drain assembly 100 when traveling over the drain assembly 100. The rounded edge 135 of the pan sidewall 128 also prevents potential cutting of the tires of a wheelchair when entering/exiting a shower. The double-thickness of the rounded edge 135 of the pan sidewall 128 at the upper distal end thereof also allows for a sealant to be applied between the single-thickness portion of the pan sidewall 128 and the adjacent tiles 2 (FIG. 2B) to prevent water seepage under the adjacent tiles 2 in the dry area 14. The rounded edge 135 also provides a linear structural guide against which existing or newly applied tiles can abut, thereby eliminating any need for an additional trim member 108 to be positioned laterally outward from the pan sidewall 128.

The drain opening 130 is defined through the base 126 and is positioned generally centrally between the first and second ends 122 and 124 of the drain pan 102, as shown in FIG. 4A. The drain pan 102 is configured to direct water or fluid collected therein to the drain opening 130. The drain opening 130 extends through the base 126 from the upper surface 132 to a lower surface 133. In the illustrated embodiment, the drain opening 130 is positioned equidistant from the first and second ends 122 and 124 such that the drain opening 130 is positioned approximately in a center of the base 126. It will be appreciated that the drain opening 130 and corresponding drain pipe 134 could be located at any location along the base 126 at locations other than the center of the drain pan 102. In another embodiment, the base 126 includes more than one opening 130 formed therethrough between the first and second ends 122 and 124 of the drain pan 102.

In the illustrated embodiment, the base 126 of the drain pan 102 is substantially flat, such that a height of the base 126 of the drain pan 102 is substantially the same along the entire length of the base 126 from the first end 122 to the second end 124. In an alternative embodiment, the base 126 is sloped toward the centrally-located drain opening 130. For example, a height of the base 126 at the first end 122 of the drain pan 102 is greater than a height of the base 126 surrounding the drain opening 130. Similarly, a height of the base 126 at the second end 124 of the drain pan 102 is greater than a height of the base 126 surrounding the centrally-located drain opening 130. In a similar manner, the height of the base 126 at both the first and second ends 122, 124 is greater than a height of the base 126 surrounding the centrally-located drain opening 130. One purpose of the height differential of the base 126 of the drain pan 102 is to assist in directing collected water or fluid toward the drain opening 130, thereby preventing water or fluid from remaining within the drain pan 102 and stagnating.

As shown in FIGS. 2B, 3, and 5A-5C, the illustrated embodiment of the drain assembly 102 includes a trim member 108. The trim member 108 is configured to provide a structural edge against which shower tiles 2 can be installed. The trim member 108 provides a linear edge to help ensure proper edge alignment of tiles 2. The trim member 108 is also configured to allow water or fluid that seeps through the grout and/or thinset between and under the tiles to be drained from the water collection area 12 through weeping or flowing through the trim member 108. The trim member 108 extends from a first end 136 to a second end 138 in a substantially linear manner. The trim member 108 is a generally L-shaped member that includes a base 140 and a trim sidewall 142 that both extend from the first end 136 to the second end 138 of the trim member 108. The trim sidewall 142 extends at an angle from an upper surface 144 of the base 140. In one embodiment, the trim sidewall 142 is substantially perpendicular to the upper surface 144. In an embodiment, the base 140 includes a plurality of spaced-apart apertures 143 formed through the thickness thereof. The apertures 143 are configured to receive thinset or mortar that provides a base for the tiles 2 being positioned immediately adjacent to (or in abutment with) trim sidewall 142. The thinset or mortar for the tiles 2 also positively connects the trim member 108 to the drain pan 102 when set. The apertures 143 also allow water or fluid that flows through the grout of the tiles and into the thinset to flow into the drain pan 102 through weeping, thereby reducing or eliminating potential mold issues with the grout in the shower because any standing water is allowed to drain by way of the drain assembly 100. In an embodiment, the trim sidewall 142 also includes a plurality of apertures 143 formed therethrough to allow water below the tiles 2 to be drained by way of the drain assembly 100. In the illustrated embodiment, the trim sidewall 142 is a solid piece that does not include the apertures 143.

As shown in the embodiment illustrated in FIGS. 2B and 5B, the trim member 108 includes a rounded edge 145, wherein the upper edge of the trim sidewall 142 of the trim member 108 is bent about 180° toward the base 140 so as to produce a generally U-shaped rounded surface at the upper distal end of the trim sidewall 142. The rounded edge 145 of the trim member 108 provides the same benefits as the rounded edge 135 of the drain pan 102 discussed above. When installing tiles 2 adjacent to the trim member 108, the edges of the tiles 2 can be placed into an abutting relationship with the rounded edge 145.

The trim member 108 of the drain assembly 100 is positionable on the upper surface 132 of the base 126 of the drain pan 102 such that the base 140 of the trim member 108 is substantially flush with base 126 of the drain pan 102, as shown in FIGS. 2B and 6A-6B. The first end 136 of the trim member 108 is positioned adjacent to the first end 122 of the drain pan 102, and the second end 138 of the trim member 108 is positioned adjacent to the second end 124 of the drain pan 102. When the trim member 108 is positioned on the base 126 of the drain pan 102, the trim sidewall 142, the pan sidewall 128, and the base 126 of the drain pan 102 define a drain channel 146 therebetween, as shown in FIG. 6B. The drain channel 146 extends along the entire length of the drain pan 102 and trim member 108. In the illustrated embodiment, the trim member 108 is positioned such that the trim sidewall 142 is substantially parallel to the pan sidewall 128 so as to provide a constant channel width Wi along the entire length of the drain assembly 100.

FIG. 7 illustrates first and second wedges 110*a*,110*b* of an embodiment of the drain assembly 100. The first and second wedges 110*a*, 110*b* are configured to provide a slanted guide for directing water that enters the drain channel 146 adjacent the first and/or second ends 122, 124 of the drain pan 102 toward the drain opening 130. Some embodiments of the drain assembly 100 have an angled base 126 for guiding or directing water toward the drain opening 130, thereby eliminating the need for the first and second wedges 110*a*, 110*b*. The first and second wedges 110*a*,110*b* are positionable on the base 126 of the drain pan 102 such that both of the first and second wedges 110*a*, 110*b* are substantially flush with the base 126. The first and second wedges 110*a*, 110*b* are positioned on opposing sides of the drain opening 130. Each of the first and second wedges 110*a*, 110*b* include a first end 150 and a second end 152, wherein the thickness of the first end 150 is larger than the thickness of the second end 152. As such, the upper surface 154 of the first and second wedges 110*a*, 110*b* that extends between the first and second ends 150, 152 is sloped or otherwise oriented at an angle relative to the base 126 of the drain pan 102. The first wedge 110*a* is positioned within the drain channel 146 such that the first end 150 of the first wedge 110*a* is positioned adjacent to the first end 122 of the drain pan 102. The second wedge 110*b* is positioned within the drain channel 146 such that the first end 150 thereof is positioned adjacent to the second end 124 of the drain pan 104. In some embodiments, the second ends 152 of both the first and second wedges 110*a*, 110*b* are positioned immediately adjacent to the drain opening 130. In other embodiments, the second ends 152 of both the first and second wedges 110*a*, 110*b* are spaced slightly away from the drain opening 130 so as to allow the water or fluid to flow along the base 126 of the drain pan 102 before entering the drain opening 130. In an embodiment, the first and second wedges 110*a*, 110*b* are identical such that the thickness at the first ends 122 are the same, the thickness at the second ends 124 are the same, and the slope of the upper surface 154 are the same. In other embodiments, the first and second wedges 110*a*, 110*b* are formed differently and have different dimensions.

A size and configuration of the first and second wedges 110*a*, 110*b* can depend on the location of the drain opening 130 in the drain pan 102. For example, if the drain opening 130 is positioned closer toward the first end 122 of the drain pan 102 than the second end 124, a length of the first wedge 110*a* is shorter than a length of the second wedge 110*b*.

FIG. 8 illustrates an embodiment of an end cap 114 of the drain assembly 100. In an embodiment, the drain assembly 100 includes a pair of end caps 114 that are spaced apart and located within the drain channel 146. An end cap 114 is positionable adjacent to both the first and second ends 122,124 of the drain pan 102. The end caps 114 are configured to support the drain cover 106 above the drain pan 102, thereby acting as spacers between the drain cover 106 and the first and second ends 122, 124 of the drain pan 102. In some embodiments, the end caps 114 support the drain cover 106 to provide a gap between the drain cover 106 and the drain pan 102. In other embodiments, the end caps 114 support the opposing ends of the drain cover 106 when the drain cover 106 rests on the drain pan 102. The end caps 114 are positioned on the upper surface 132 of the base 126. The end caps 114 include a base wall 164 and a sidewall 166 that extends at an angle from the base wall 164. In the illustrated embodiment, the sidewall 166 extends in a substantially perpendicular direction from the base wall 164. When installed, one end cap 114 is positioned adjacent to the first end 122 of the drain pan 102 and another end cap 114 is positioned adjacent to the second end 124 of the drain pan. The base wall 164 of the end caps 114 is positioned substantially flush with the upper surface 132 of the base 126 of the drain pan 102. The base wall 164 of one of the end caps 114 is located below the first end 150 of the first wedge 110*a*, and the base wall 164 of the other end cap 114 is located below the first end 150 of the second wedge 110*b*.

As shown in FIG. 8, the width of the sidewall 166 of the end caps 114 is substantially the same width as the base wall 164. The sidewall 166 includes and upper surface 170 at the distal edge opposite the base wall 164. The upper surface 170 of the sidewall 166 is generally an inverted V-shape that forms an apex 172 that is directed away from the base wall 164. The shape of the upper surface 170 and apex 172 of the sidewall 166 is substantially the same shape as the lower surface of the drain cover 106, as will be explained below.

FIG. 9 illustrates and exemplary embodiment of an end dam 118 of the drain assembly 100. In an embodiment, the drain assembly 100 includes a pair of end dams 118, wherein each end dam 118 is positioned adjacent to the first or second end 122, 124 of the drain pan 102. The end dams 118 are positioned at least partially below and external to the first and second ends 122, 124 of the drain pan 102, thereby enclosing the first and second ends 122, 124 of the drain pan 102. The end dams 118 are configured cooperate with the drain pan 102 to seal the ends of the drain channel 146 at the first and second ends 122, 124 of the drain pan 102. Each end dam 118 includes a base wall 176, a first sidewall 178, and a second sidewall 180. The first and second side walls 178,180 extend at an angle from the base wall 176, and the first and second side walls 178, 180 are oriented at an angle therebetween. The base wall 176 and the first and second side walls 178, 180 form a corner at the intersection of each of these walls, wherein the corner of each end dam 118 receives a corresponding junction between the base 126 and pan sidewall 128 of one of the ends 122, 124 of the drain pan 102. The end dams 118 positioned adjacent to the opposing ends of the drain pan 102 are mirror images of each other.

As shown in FIG. 9, the base wall 176 of each end dam 118 is a substantially flat or planar member having a generally rectangular shape. The end dams 118 are configured to be positioned on the subfloor 3 (FIG. 2B) or on top of a waterproof layer or sheet located between the end dams 118 and the subfloor 3. The first sidewall 178 extends from the base wall 176 at an angle and also extends along the long side of the rectangular base wall 176. In an embodiment, the first sidewall 178 is oriented substantially perpendicular relative to the base wall 176. The second sidewall 180 extends from the base wall 176 at an angle and in the same direction as the first sidewall 178. The second sidewall 180 also extends from the first sidewall 178 in a substantially perpendicular manner. In an embodiment, the end dams 118 are stamped from a piece of sheet metal and the first and second sidewalls 178, 180 are subsequently connected to each other by way of a weld, solder, or other attachment means. In the illustrated embodiment, the second sidewall 180 extends a shorter length from the base wall 176 than the length that the first sidewall 178 extends from the base wall 176. In other words, the second sidewall 180 has a shorter height than the first sidewall 178. The base wall 176 in cooperation with the first and second sidewalls 178, 180 define a containment area 186. The containment area 186 is configured to substantially prevent water from migrating behind the tile wall and/or flooring.

Figure 12:
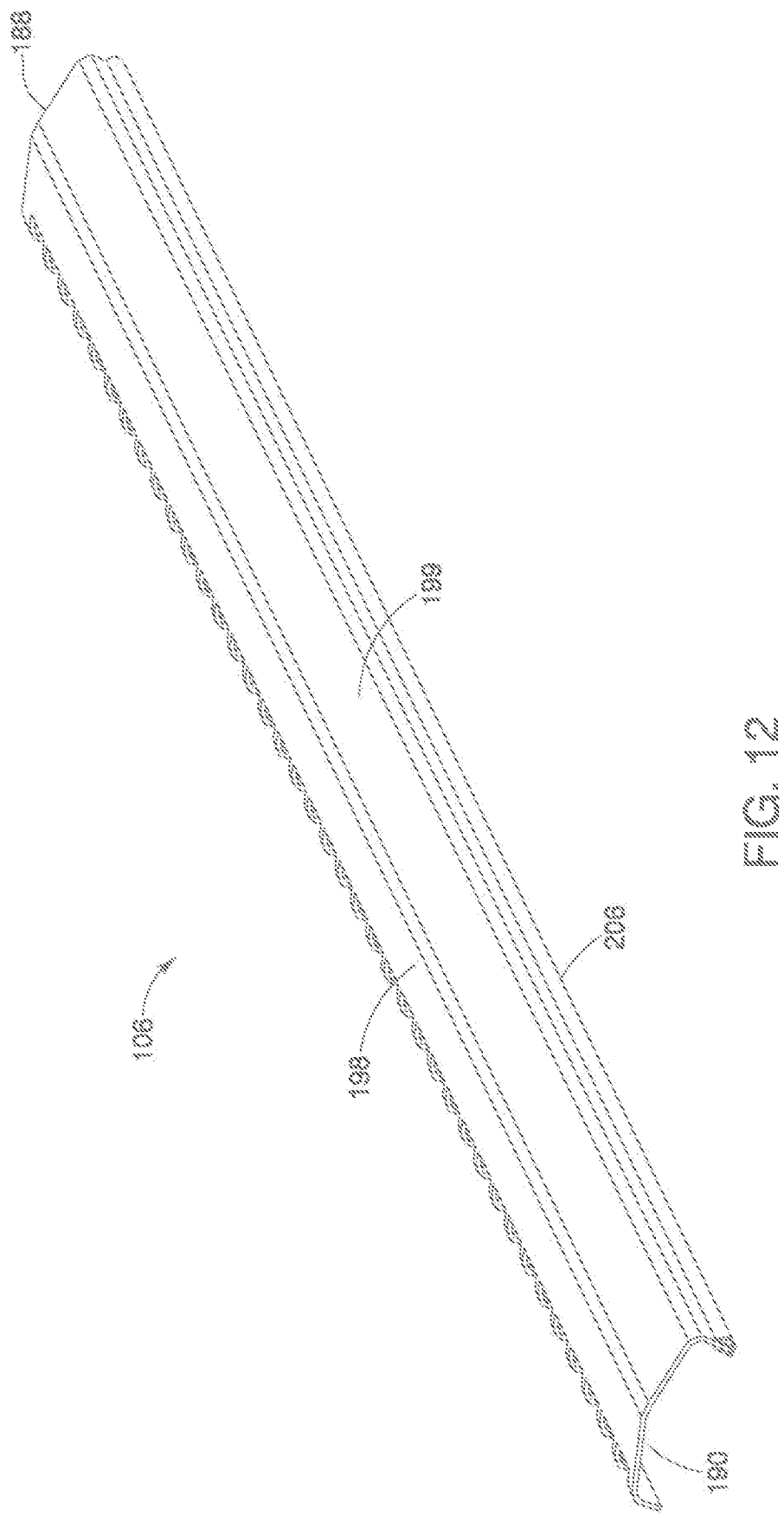
FIG. 12 illustrates a rear perspective view of the drain cover shown in FIG. 10.

FIGS. 10-12 illustrate an exemplary embodiment of a drain cover 106 of the drain assembly. The drain cover 106 is an elongated member extending between a first end 188 and a second end 190. The drain cover 106 is formed as a generally inverted U-shaped member. The drain cover 106 is configured to provide a protective cover over the drain channel 146 while also allowing water from the water collection area 12 to flow or otherwise pass through the drain cover 106 into the drain channel 146. The drain cover 106 provides a nearly zero-entry for a shower entrance, thereby eliminating the short step commonly used for walk-in showers for containing water within the shower stall. Although the drain cover includes a pair of slightly inclined surfaces that join at an apex, the overall rise:run ratio of the drain cover 106 meets the ANSI A117.1.303 standards as well as ADA 608.7 standards with respect to shower entries for accessible floors, particularly for roll-in showers.

In the illustrated embodiment, the drain cover 106 includes a plurality of apertures 191 formed through the thickness thereof, as shown in FIGS. 10-12. The drain cover 106 is positioned above the drain pan 102 such that a portion of the drain cover is located within the drain channel 146.

As shown in FIGS. 9-12, an embodiment of the drain cover 106 includes a cover wall 192, a first sidewall 194, and a second sidewall 196. The cover wall 192 includes a first cover wall portion 198 and a second cover wall portion 199. The first and second sidewalls 194, 196 are spaced apart and oriented substantially parallel to each other. The cover wall 192 extends between the first and second sidewalls 194, 106, wherein the cover wall 192 and the first and second sidewalls 194, 196 are integrally formed together as a single piece. The cover wall 192 extends from the first sidewall 194 at an angle, thereby creating a first curved transition 202 between the cover wall 192 and the first sidewall 194. Similarly, the cover wall 192 extends from the second sidewall 196 at an angle, thereby creating a second curved transition 204 between the cover wall 192 and the second sidewall 196. The first and second cover wall portions 198, 199 of the cover wall 192 are sloped such that they join at a central apex 200, wherein the apex 200 is slightly rounded to prevent a sharp edge. The apex 200 extends longitudinally along the entire length of the drain cover 106. In an aspect, the apex 200 is located in a center of the cover wall 192 between the first curved transition 202 and the second curved transition 204.

In an embodiment, the drain cover 106 includes a plurality of apertures 191 formed therethrough, as shown in FIGS. 10-11. The apertures 191 are configured to allow the water from the water collection area 12 (FIG. 2A) to flow into the drain channel 146 of the drain assembly 100. In an embodiment, the apertures 191 are formed through the thickness of a portion of the first sidewall 194, first curved transition 202, and a portion of the first cover wall portion 198. In other embodiments, the apertures 191 are formed through only the first curved transition 202. In further embodiments, the apertures 191 are formed through only the first curved transition 202 and a portion of the first cover wall portion 198. It should be understood by one having ordinary skill in the art that the relative position of the apertures 191 relative to the first sidewall 194, the first curved transition 202, and the first cover wall portion 198 can vary depending on the size of the apertures 191 and the spacing thereof along the length of the drain cover 106. In additional embodiments, a plurality of apertures 191 are formed through a portion of the first cover wall portion 198 and additional apertures 191 are formed through a portion of the first sidewall 194 or through both a portion of the first sidewall 194 and a portion of the first curved transition 202. In the illustrated embodiment, there are no apertures formed through the thickness of the drain cover 106 at the second sidewall 196, second curved transition 204, and/or the second cover wall portion 199 because the slope of the cover wall 192 should prevent water from flowing over the apex 200 thereby eliminating the need for apertures for water drainage adjacent to the second sidewall 196. In other embodiments (not shown), a plurality of apertures are formed through a portion of the second sidewall 196, the second curved transition 204, and the second cover wall portion 199, wherein the size, shape, and location of the apertures mirror those formed on the opposite longitudinal side of the drain cover 106. Each of the plurality of apertures 191 is aligned substantially parallel to each of the other plurality of apertures 191 along the length of the drain cover 106. Each of the plurality of apertures 191 is substantially similarly sized and configured to each of the other plurality of apertures 191. Each of the plurality of apertures 191 is spaced equidistant from each adjacent aperture 191.

Figure 13:
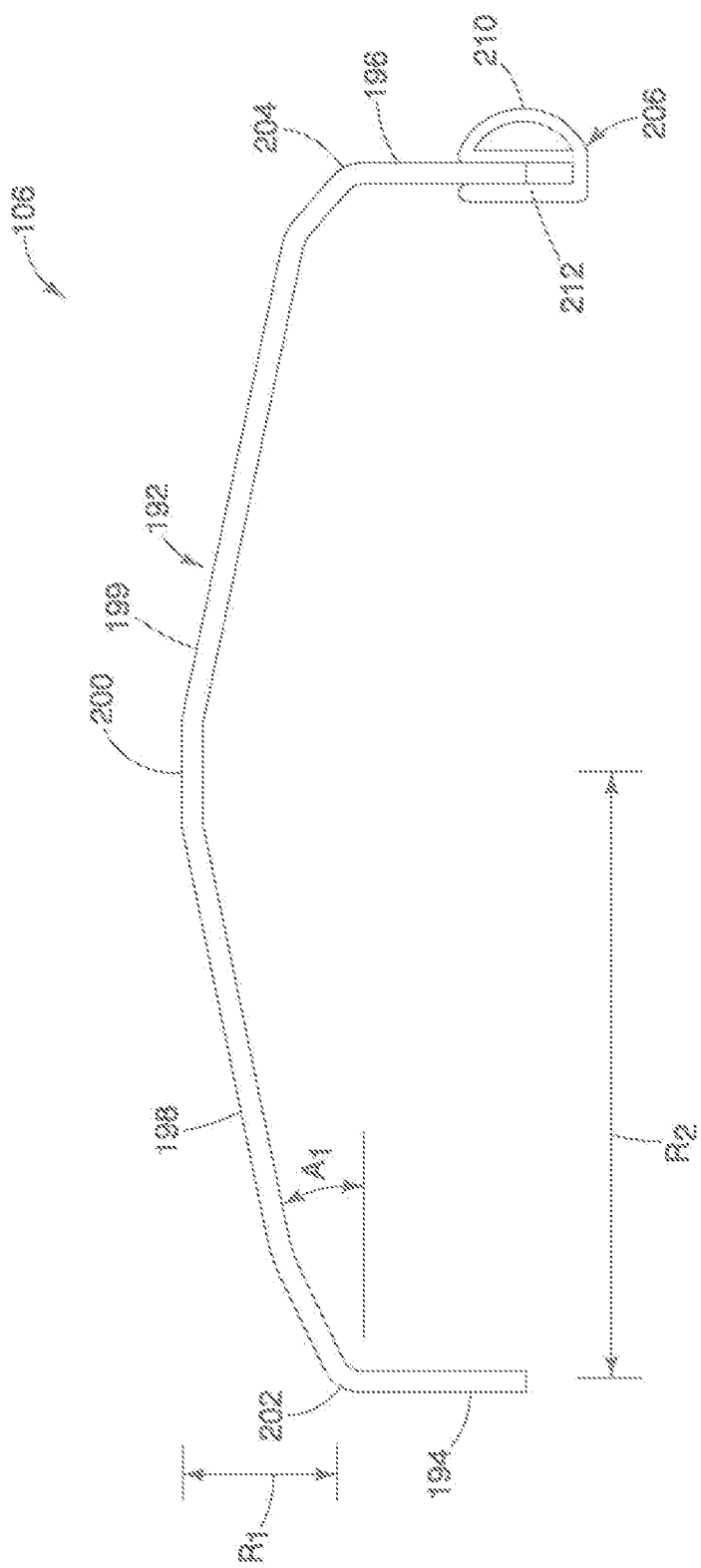
FIG. 13 illustrates an end view of a drain cover with a gasket seal attached thereto.

As shown in FIG. 13, the cover wall 192 includes a first cover wall portion 198 and a second cover wall portion 199 joined at an apex 200. In the illustrated embodiment, the apex 200 is a generally flat transition between the oppositely-sloped first and second cover wall portions 198, 199. In other embodiments, the apex 200 is formed as a generally rounded transition between the oppositely-sloped first and second cover wall portions 198, 199. It should be understood by one having ordinary skill in the art that although the apex 200 can form a corner or edge between the first and second cover wall portions 198, 199, such a transition may be irritating to a user's feet as they step on the apex 200 during entry/exit of the shower. The apex 200 formed as a corner or edge can also increase the slope of the first and second cover wall portions 198, 199 making it more difficult for a wheelchair to easily and safely cross over the drain cover 106 during entry/exit of the shower. The rise $R_1$ of the cover wall 192 is defined as the vertical distance between the apex 200 and the location at which the first and second sidewalls 194, 196 join the first and second curved transitions 202, 204. The rise $R_1$ of the cover wall 192 is one-half inch (½") or less, which satisfies the ADA 608.7 standard for shower thresholds. The run $R_2$ of the cover wall 192 is defined as the lateral distance between the location at which the first sidewall 194 joins the first curved transition 202 and the center of the apex 200. The slope Ai of the first cover wall portion 198 is defined as the angle formed by the rise $R_1$ and the run $R_2$. The slope Ai of the first cover wall portion is 45.degree. or less. The apex 200 is preferably beveled or rounded, which satisfies the ADA 608.7 standard for shower thresholds. The slope Ai and the ratio of rise to run ($R_1$:$R_2$) are optimized so as to prevent water from the water collection area 12 to slosh or otherwise flow over the apex 200, thereby containing the flow of water and directing such flow into the drain channel 146.

The illustrated embodiment of the drain cover 106 includes a plurality of notches 205, as shown in FIG. 11. The notches 205 are formed into the lower distal edge of the first sidewall 194. Because the drain pan 102 is L-shaped (instead of U-shaped), the notches 205 in the first sidewall 194 of the drain cover 106 allow water or other fluids below the adjacent tiles 2 to flow through the drain cover 106 and into the drain channel 146 that allows the water to be drained by weeping.

As shown in the exemplary embodiment illustrated in FIGS. 2B and 12-13, the drain cover 106 further includes a gasket seal 206 attached to the lower distal edge of the second sidewall 196. The gasket seal 206 extends along the entire length of the second sidewall 106. The gasket seal 206 is configured to prevent water or other liquid within the drain channel 146 from exiting the drain channel 146 through a small gap between the drain cover 106 and the drain pan 102 when the drain assembly 100 is assembled. The gasket seal 206 is also configured to provide a lateral biasing force to the drain cover 106 such that the biasing force pushes the first sidewall 194 of the drain cover 106 against the trim sidewall 142 of the trim member 108 to provide a frictional connection therebetween. This frictional connection between the drain cover 106 and the trim member 108 acts to maintain the drain cover 106 in the installed location relative to the drain pan 102. The gasket seal 206 is a flexible member that is laterally wider than the gap between the drain cover 106 and the drain pan 102 such that the gasket seal 206 is compressed during installation to fit within the gap, and it is the compression of the gasket seal 206 that generates the lateral biasing force. In an embodiment, the gasket seal 206 is formed separately from the drain cover 106 and attached thereto prior to installation of the drain assembly 100. In another embodiment, the gasket seal 206 is integrally formed onto the drain cover 106 by way of overmolding or other similar manufacturing process for proving a permanent connection between the gasket seal 206 and the drain cover 106.

As shown in FIG. 13, an exemplary embodiment of a gasket seal 206 surrounds the lower end of the second sidewall 196 of the drain cover 106. The gasket seal 206 is a flexible member, wherein the flexation of the gasket seal 206 generates a biasing force, as discussed above. The gasket seal 206 includes a D-shaped portion 210 integrally formed with an L-shaped portion 212, wherein the L-shaped portion 212 extends from the D-shaped portion 210. The D-shaped portion 210 includes a substantially linear wall having a semi-circular or curved wall extending between both opposing ends of the linear wall. L-shaped portion 212 includes a pair of substantially linear walls attached to each other at a vertex in a substantially perpendicular manner, wherein one of the walls is larger than the other. The shorter linear wall of the L-shaped portion 212 is integrally formed with and connected to the lower distal end of the linear wall of the D-shaped portion 210. As a result, the linear wall of the D-shaped portion 210 and both linear walls of the L-shaped portion 212 define a U-shaped gap that is configured to receive the lower end of the second sidewall 196 of the drain cover 106. The shorter wall of the L-shaped portion 212 is positioned adjacent to or abutting the lower distal edge of the second sidewall 196, the longer wall of the L-shaped portion 212 abuts the inner surface of the second sidewall 196 directed toward the drain channel 146, and the linear wall of the D-shaped portion 210 abuts the outer surface of the second sidewall 196. In another embodiment, the gasket seal 206 is formed of a pair of oppositely-directed D-shaped portions that are connected by way of a short linear wall to form a U-shaped gap for receiving the second sidewall 106 of the drain cover 106. In other embodiments, the D-shaped portion 210 is replaced with a square- or rectangular-shaped portion. It should be understood by one having ordinary skill in the art that the gasket seal 206 can have any cross-sectional shape as long as it is attachable to the second sidewall 196 of the drain cover 106 and provides a seal between the outwardly-directed surface of the second sidewall 196 of the drain cover 106 and the inwardly-directed surface of the pan sidewall 128 to prevent leakage of water from the drain channel 146 therethrough.

Figure 14:
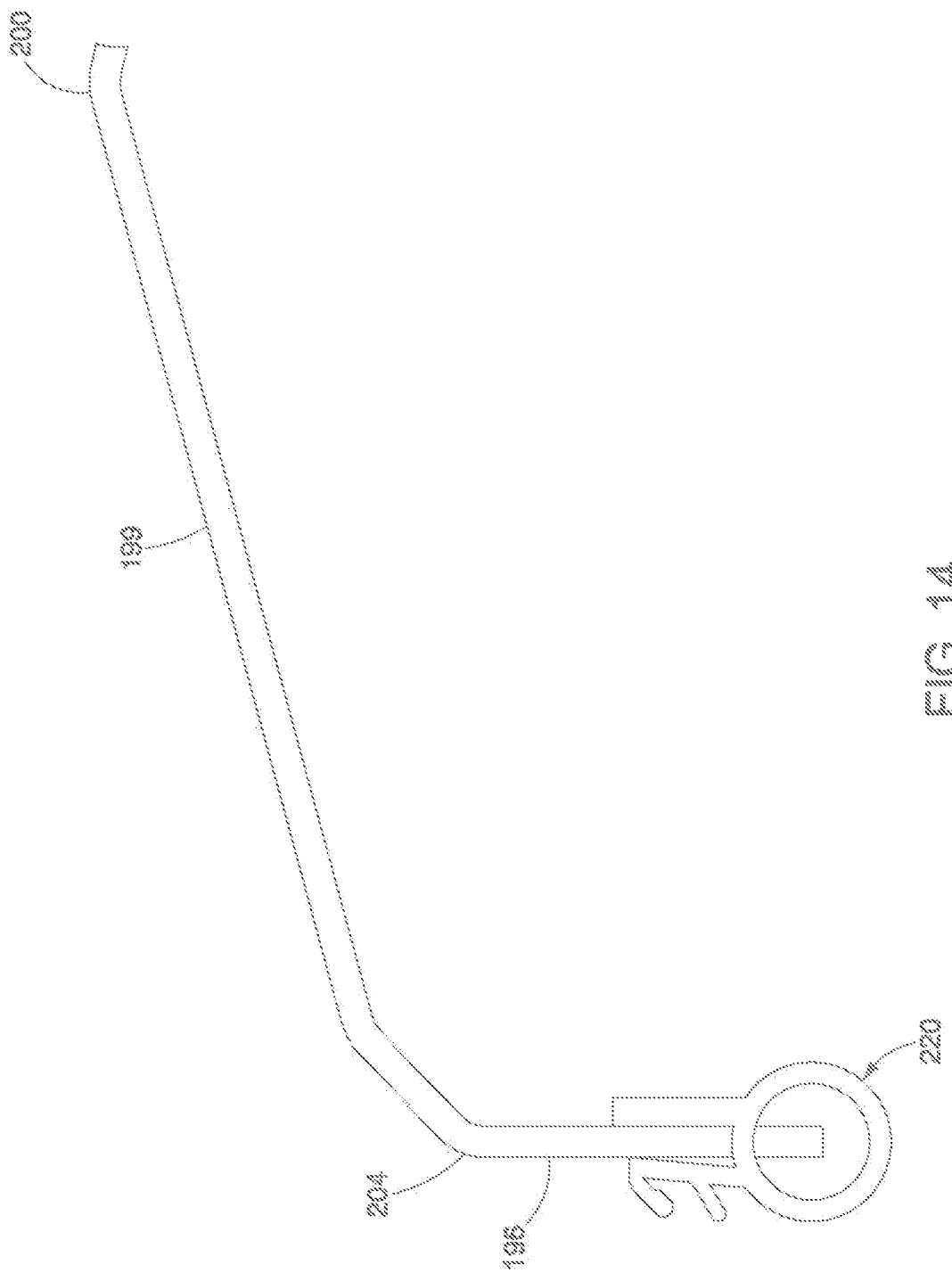
FIG. 14 illustrates an end view of a portion of a drain cover with another embodiment of a gasket seal attached thereto.

In another embodiment (not shown), the gasket seal 206 discussed above is replaced with a bead of sealant or adhesive sealant placed along the entire length of the drain pan 102 at the junction between the base 126 and the pan sidewall 128 prior to positioning the drain cover 106 within the drain channel 146. The lower edge of the second sidewall 196 of the drain cover 106 is inserted into the bead of sealant, thereby creating a seal between the drain cover 106 and drain pan 102 to prevent leakage of water from the drain channel 146 through any potential gap between the second sidewall 196 of the drain cover 106 and the pan sidewall 128 of the drain pan 102. FIG. 14 shows another embodiment of a gasket seal 220, wherein the gasket seal 220 includes a cylindrical base having a slot formed into the top for receiving the second sidewall 196 of the drain cover 106. The gasket seal 220 further includes a first positioning wall extending from the cylindrical base. The first positioning wall is a substantially linear member. such that the first positioning wall is configured to abut the inwardly-directed surface of the second sidewall 196 of the drain cover 106. The gasket seal 220 further includes a second positioning wall extending from the cylindrical base in a spaced-apart manner relative to the first positioning wall. The second positioning wall includes a linear portion and a pair of barbed portions that extend from the linear portion, wherein the linear portion abuts the outwardly-directed surface of the second sidewall 196 of the drain cover 106 and the barbed portions contact the inwardly-directed surface of the pan sidewall 128. The gasket seal 220 is configured to prevent water from leaking from the drain channel 146 through the gap between the drain cover 106 and the drain pan 102.

Installation of the drain assembly 100 involves various steps, including preparing the area on/through the floor where the drain assembly 100 is going to be installed. It should be understood by one having ordinary skill in the art that although the steps of the drain assembly discussed below are in reference to a retrofit scenario in which a bathtub is being removed and the space being converted to a shower stall, one having ordinary skill in the art will understand proper installation of the drain assembly 100 in similar and different locations as well as the changes in installation steps necessary for proper installation.

Figure 15:
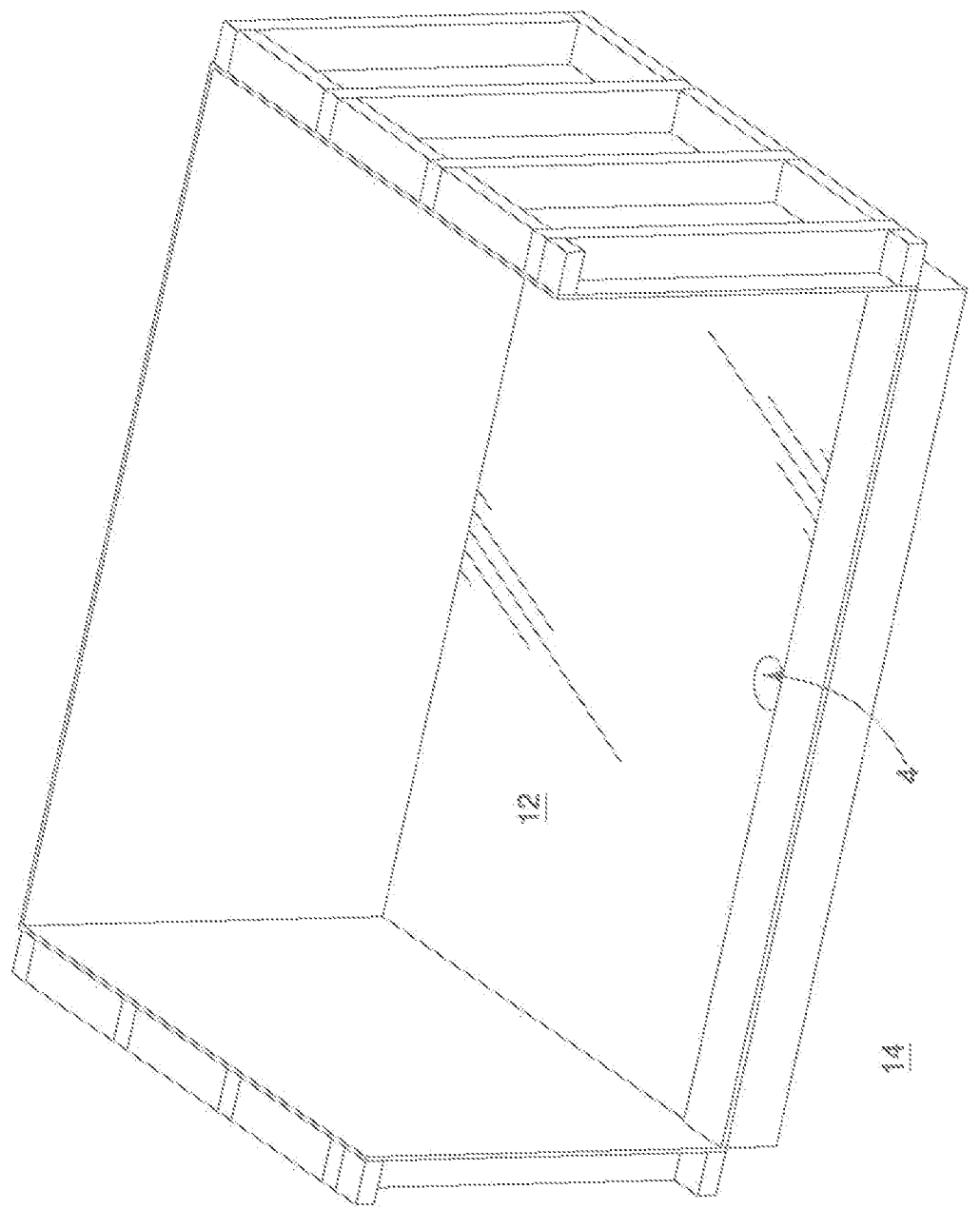
FIG. 15 illustrates a drain hole formed through the subfloor or concrete of an existing bath/shower area.

Installation of the drain assembly 100 begins by removing the bathtub 1, as shown in FIGS. 1A-1B. Because the drain hole 4 through which water drained from the bathtub 1 is located near the front of the bathtub, a retrofit installation of the drain assembly at the transition between the water collection area 12 of the shower and the dry area 14 of the bathroom requires a new drain hole 4 to be drilled at the transition between the water collection area 12 and the dry area 14, as shown in FIG. 15. It should be understood by one having ordinary skill in the art that once the bathtub 1 is removed, the drain assembly 100 is installed prior to the tiles of water collection area 12 being installed such that the drain assembly 100 is installed on the existing subfloor 3.

Figure 16:
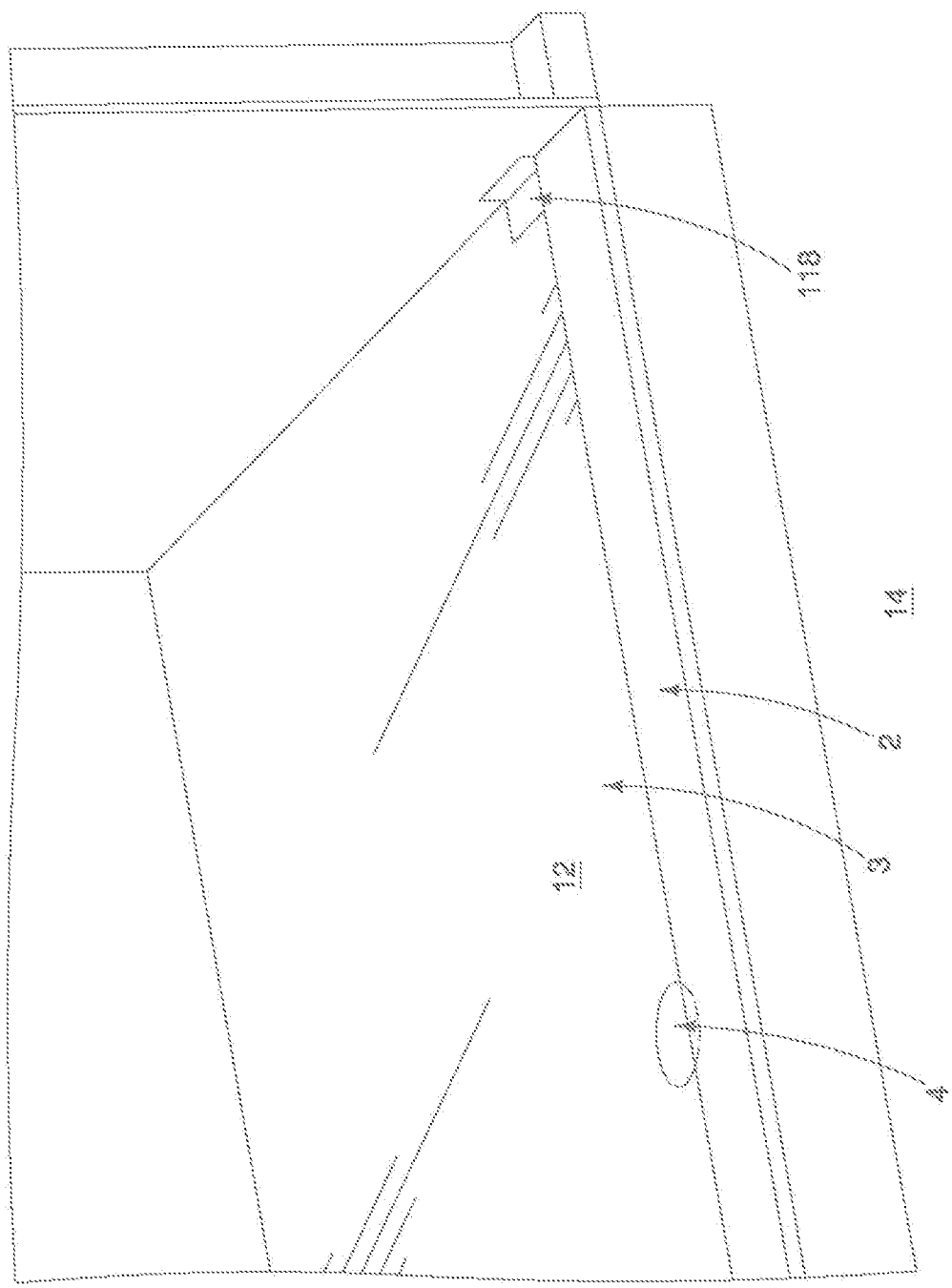
FIG. 16 illustrates installation of one of the pair of end dams of the drain assembly.

After the drain hole 4 is drilled, the next step involves securing the first and second end dams 118 to the subfloor 3 as well as the vertical wall of the shower. FIG. 16 shows one of the end dams 118 positioned on the subfloor 3 and abutting the vertical shower wall as well as the tiles 2 of the dry area 14. It should be appreciated by one skilled in the art that a second end dam 118 is similarly positioned at the opposite end of the transition between the water collection area 12 and the dry area 14. The first and second end dams 118 provide a seal between the end dams 118 and the subfloor 3, the vertical shower wall, and the remaining tiles 2 of the dry area 14 to prevent water from migrating from the drain pan 102 to any of the surrounding walls or adjacent tiles 2.

After the first and second end dams 118 are positioned on the subfloor 3, a bead of sealant is placed on the subfloor 3 or concrete on which the drain pan 102 is positioned. The drain pan 102 is positioned on the subfloor 3 such that the downwardly-directed drain pipe 134 of the drain pan 102 extends into the drain hole 4. The opposing ends 122, 124 of the drain pan 102 are positioned on top of the base wall 176 of the corresponding end dam 118. At least a portion of both the first end 122 and the second end 124 of the drain pan 102 is positioned within the containment area 186 of the first and second end dams 118. Positioning the drain pan 102 in such a manner on top of the first and second end dams 118 substantially prevents water from migrating behind the walls and tiling. An optional bead of sealant is applied to the exposed edge of the tiles 2 of the dry area 14 before installing the drain pan 102 to create a seal between the drain pan 102 and the tiles 2.

Figure 17:
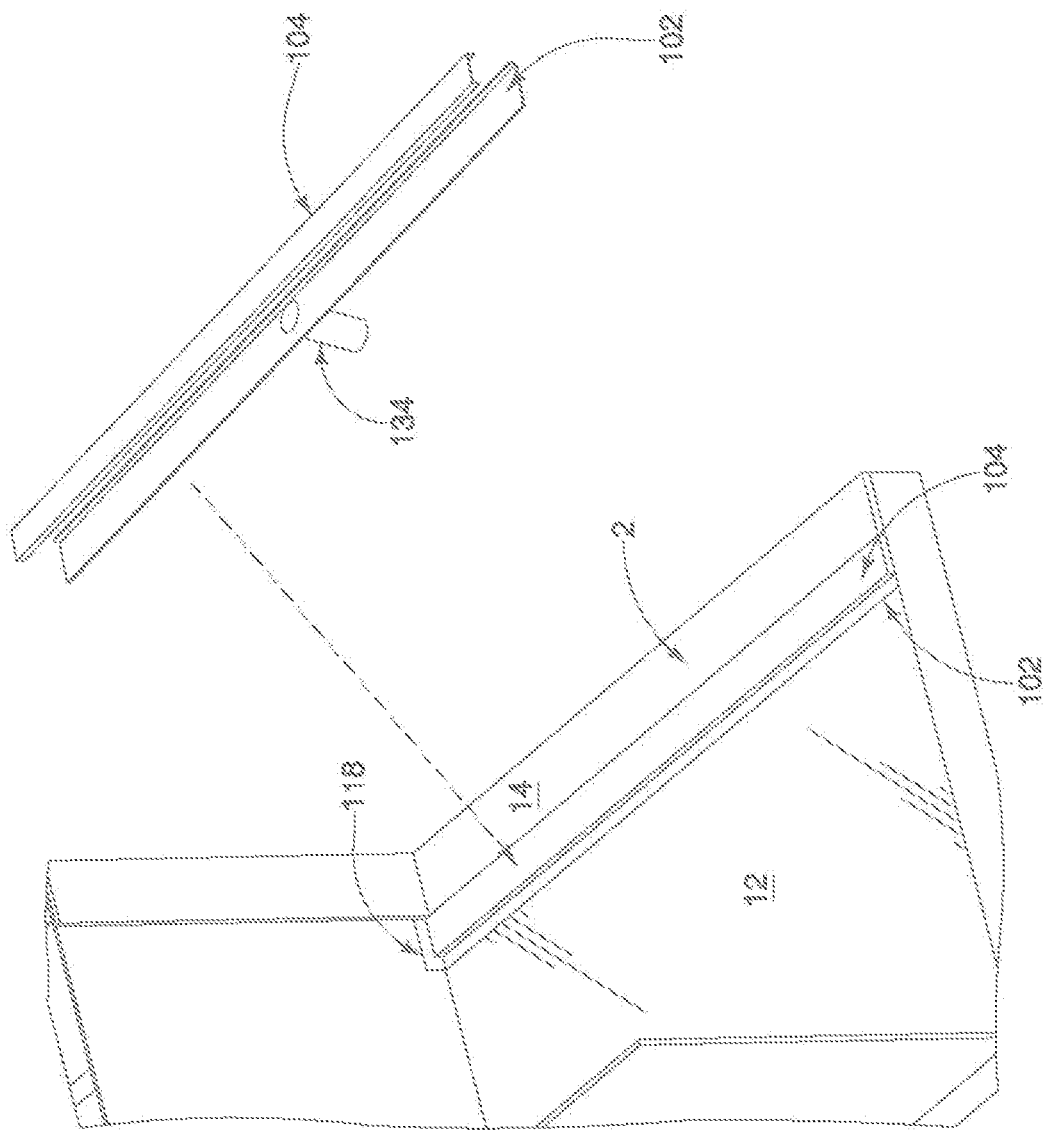
FIG. 17 illustrates the installation of a drain pan and guide member.

After the drain pan 102 is installed, the guide member 104 can be temporarily positioned on the base 126 of the drain pan 102, as shown in FIG. 17. The guide member 104 is configured to define the drain channel width while also providing a structural guide against which the trim member 108 can abut during installation thereof. The guide member 104 is positioned such that the guide member 104 extends from the first end 122 to the second end 124 of the drain pan 102 and abuts the pan sidewall 128. The guide member 104 substantially prevents any sealant or other materials from entering the drain opening 130 during assembly of the drain assembly 100. The guide member 104 is a generally inverted U-shaped member wherein one sidewall is positioned adjacent to the pan sidewall 128, the top surface is positioned over the drain opening 130, and the opposing second sidewall is configured to abut the trim member 108 before the guide member 104 is removed from the drain pan 102.

After the guide member 104 is positioned on the drain pan 102, a layer of sealant is applied to the subfloor 3 or concrete adjacent to the longitudinal edge of the base 126 of the drain pan 102 and to the portion of the base 126 of the drain pan 102 that is not covered by the guide member 104. The sealant can also be applied to the first and second end dams 118 and the wall areas adjacent to each of the first and second end dams 118. The sealant substantially prevents water from leaking under the drain pan 102 onto the flooring below, and substantially prevents water from leaking around the end dams 118 to the walls behind.

Figure 18:
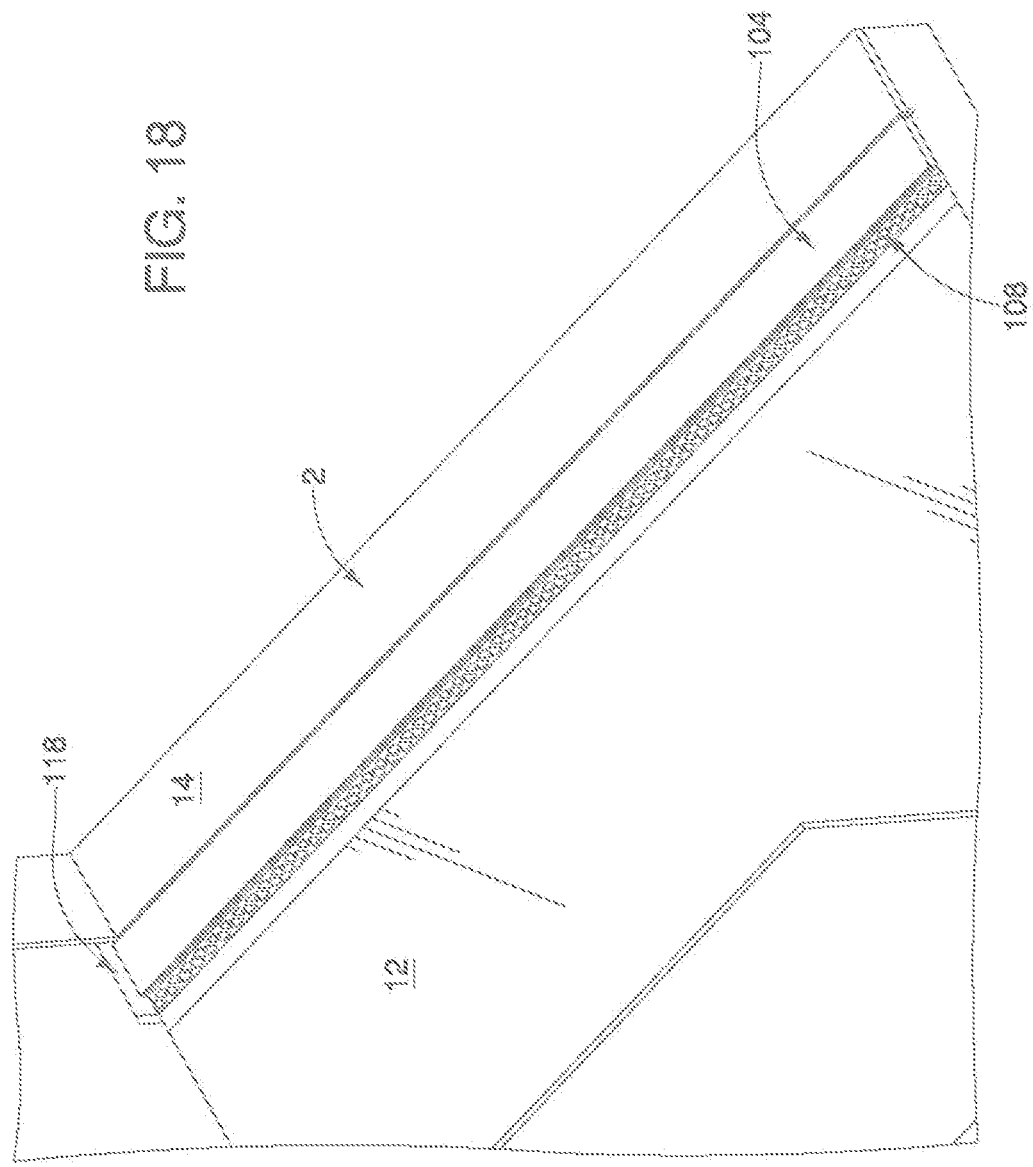
FIG. 18 illustrates the installation of a tile member and waterproof sealant applied to the drain pan.

After the sealant is applied, the trim member 108 is positioned on the base 126 of the drain pan 102, as shown in FIG. 18. The trim member 108 is positioned adjacent to the guide member 104 and on top of the base 126. The longitudinal edge of the base 140 of the trim member 108 is aligned with the longitudinal edge of the base 126 of the drain pan 102 such that the edges are substantially aligned in a co-planar manner. The trim sidewall 142 abuts the guide member 104 such that when the guide member 104 is removed, the distance between the trim sidewall 142 and the pan sidewall 128 defines the width Wi of the drain channel 146 (FIG. 6B). A layer of thinset is applied to the base 140 of the trim member 108 to fill the apertures 143 formed therein and to secure the trim member 108 to the drain pan 102.

After the trim member 108 has been installed and secured to the drain pan 102, the tiles 2 in the water collection area 12 are installed. The tiling can be installed to cover the base 140 of the trim member 108 up to the trim sidewall 142. The guide member 104 can be removed from the drain channel 146 once the trim member 108 is secured to the drain pan 102 and either before or after the tiles 2 are installed in the water collection area 12. As shown in FIG. 2A, the tiles 2 of the water collection area 12 are installed such that the upper surfaces of the tiles 2 are sloped downwardly toward the drain assembly 100 in order to direct the water in the water collection area 12 toward the drain assembly 100.

After the tiles 2 are installed, the first and second wedges 110 are positioned within the drain channel 146 as described above and shown in FIG. 19. The first and second wedges 110 are secured to the base 126 of the drain pan 102 by, for example, glue or other adhesive. It will be appreciated by one having ordinary skill in the art that installing the first and second wedges 110 is optional. For example, if the drain pan 102 is sloped toward the drain opening 130, installing the first and second wedges 110 is not needed.

After securing the first and second wedges 110 to the drain pan 102, the first and second end caps 114 are positioned at the first and second ends 122, 124 of the drain pan 102. In an embodiment, the first and second end caps 114 are positioned between the first and second wedges 110 and the first and second end dams 118 such that the upper surface 170 of the sidewall 166 of the end caps 114 extend above the first ends 150 of the wedges 110 so as to provide a surface upon which the drain cover 106 can rest.

Prior to inserting the drain cover 106 into the drain channel 146, the user should inspect the gasket seal 206 to ensure the gasket seal 206 is properly secured to the drain cover 106 as described above. The drain cover 106 is then positioned within the drain channel 146 such that the plurality of apertures 191 face toward the water collection area 12, as shown in FIG. 20. The drain cover 106 is aligned relative to the drain pan 102 such that the gasket seal 206 and the second sidewall 196 of the drain cover 106 are positioned immediately adjacent to the pan sidewall 128. As the drain cover 106 is inserted into the drain channel 146, the gasket seal 206 is compressed, thereby creating a lateral biasing force that pushes the drain cover 102 laterally toward the trim member 108. The gasket seal 206 biases the first sidewall 194 of the drain cover 106 into a frictional engagement with the trim sidewall 142.

When the drain cover 106 is positioned within the drain channel 146, the apex 200 of the drain cover 106 is located above the base 126 of the drain pan 102 and above the drain channel 146. The height and location of the apex 200 creates a damming function that can direct water exiting from the water collection area 12 into the drain channel 146 through the apertures 191 and into the pipeline 16 below the flooring. The height of the apex 200 and the slope of the first cover wall portion 198 are configured to substantially prevent water from flowing to the dry area 14 from the water collection area 12. The drain cover 106 allows a greater flow rate in a situation where the depth of the installation is limited due to the desire to leave existing floor tile in the dry area 14 in place while replacing or installing the drain assembly 100.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A linear drain assembly comprising:
   a drain pan having a pan base and a pan sidewall coupled to a first side of the pan base and oriented at an angle relative to the pan base, the pan base having a drain opening formed therethrough, wherein the drain pan lacks a sidewall along at least part of a second, opposite side of the pan base to allow liquid to flow into the drain pan on the second side of the pan base;
   a trim member having a trim base and a trim sidewall coupled to the trim base and oriented at an angle relative to the trim base, wherein the trim member is positioned on the pan base such that the trim sidewall, the pan sidewall and at least a portion of an upper surface of the pan base define a drain channel therebetween; and
   a drain cover having a plurality of apertures formed therethrough, wherein the drain cover is positioned at least one of in or above the drain channel to allow liquid to flow through the drain cover into the drain channel.

2. The assembly of claim 1 wherein the drain pan is generally "L" shaped in end view.

3. The assembly of claim 1 wherein the pan sidewall is oriented substantially perpendicular to the pan base.

4. The assembly of claim 1 wherein the pan base is generally flat and planar, and wherein the drain pan lacks a sidewall along an entirety of the second side of the pan base.

5. The assembly of claim 1 wherein the drain cover includes first cover wall portion coupled to a second cover wall portion at an apex, a first sidewall coupled to a periphery of the first cover wall portion and a second sidewall coupled to a periphery of the second cover wall portion, wherein the first sidewall is positioned adjacent to the trim sidewall and has a plurality of notches formed therein to allow liquid to flow therethrough.

6. The assembly of claim 1 wherein the assembly further includes a pair of end caps, each end cap being positioned at an end of the drain pan and supporting the drain cover thereon.

7. The assembly of claim 1 wherein the assembly further includes a pair of end dams, each end dam being positioned at an end of the drain pan, wherein each of the end dams includes a base wall supporting the drain pan thereon, includes a first side wall oriented generally perpendicular to the end dam base wall, and includes a second side wall oriented generally perpendicular to the end dam base wall and the first side wall.

8. The assembly of claim 1 wherein the assembly includes at least one wedge positioned in the drain channel and arranged to direct liquid in the drain channel toward the drain opening.

9. A linear drain assembly comprising:
   a drain pan having a pan base and a pan sidewall coupled to the pan base and oriented at an angle relative to the pan base, the pan base having a drain opening formed therethrough;
   a trim member having a trim base and a trim sidewall coupled to the trim base and oriented at an angle relative to the trim base, wherein the trim member is configured to be positioned on the pan base such that the trim sidewall, the pan sidewall and at least a portion of an upper surface of the pan base define a drain channel therebetween; and
   a drain cover having a plurality of apertures formed therethrough, wherein the drain cover is configured to be positioned in or above the drain channel to allow liquid to flow through the drain cover into the drain channel, and wherein the drain cover has a sealing member along one longitudinal side thereof that is configured to sealingly engage the drain pan.

10. The assembly of claim 9 wherein the sealing member is a gasket.

11. The assembly of claim 10 wherein the gasket is positioned along or adjacent to a lower edge of the drain cover.

12. The assembly of claim 10 wherein the gasket is compressed between the drain cover and the drain pan to cause the trim sidewall and drain cover to be pushed into frictional engagement with each other.

13. The assembly of claim 10 wherein at least part of the gasket is generally "D" shaped in end view.

14. The assembly of claim 10 wherein the gasket includes a generally cylindrical base with a slot receiving a portion of the drain cover therein, and a pair of generally parallel positioning walls extending from the cylindrical base.

15. The assembly of claim 9 wherein the sealing member is a bead of sealant.

16. The assembly of claim 9 wherein the assembly includes at least one wedge positioned in the drain channel and arranged to direct liquid in the drain channel toward the drain opening.

17. The assembly of claim 9 wherein the sealing member sealingly engages the pan sidewall.

18. The assembly of claim 9 wherein the sealing member extends along an entire length of the longitudinal side of the drain cover.

19. The assembly of claim 9 wherein the pan sidewall is a one-piece unitary component with the pan base.

\* \* \* \* \*